US010554802B2

(12) United States Patent
Moore et al.

(10) Patent No.: US 10,554,802 B2
(45) Date of Patent: Feb. 4, 2020

(54) SYSTEMS AND METHODS FOR IDENTIFYING NOISES WITH WIRELESS TRANSDUCER

(71) Applicant: JS Products, Inc., Las Vegas, NV (US)

(72) Inventors: James Moore, Las Vegas, NV (US); Francisco Javier Hernandez, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 0 days.

(21) Appl. No.: 14/868,198

(22) Filed: Sep. 28, 2015

(65) Prior Publication Data

US 2016/0021475 A1 Jan. 21, 2016

Related U.S. Application Data

(63) Continuation-in-part of application No. 14/506,514, filed on Oct. 3, 2014, now abandoned.

(60) Provisional application No. 62/056,372, filed on Sep. 26, 2014, provisional application No. 62/002,756, filed on May 23, 2014, provisional application No. 61/887,289, filed on Oct. 4, 2013.

(51) Int. Cl.
*H04M 1/658* (2006.01)
*G01H 3/00* (2006.01)

(52) U.S. Cl.
CPC .............. *H04M 1/658* (2013.01); *G01H 3/00* (2013.01)

(58) Field of Classification Search
CPC .................................. H04M 1/658; G01H 3/00
See application file for complete search history.

(56) References Cited

U.S. PATENT DOCUMENTS

| 3,817,647 A | 6/1974 | Lemelson |
| 3,830,090 A | 8/1974 | Hersch et al. |
| 4,213,119 A | 7/1980 | Ward et al. |
| 5,435,185 A | 7/1995 | Eagan |

(Continued)

FOREIGN PATENT DOCUMENTS

| WO | WO 2012/004771 | 1/2012 |
| WO | WO 2012/060810 | 5/2012 |

OTHER PUBLICATIONS

F. L. Lewis, Wireless Sensor Networks, To appear in Smart Environments: Technologies, Protocols, and Applications, ed. D.J. Cook and S.K. Das, John Wiley, New York, 2004, http://210.32.200.159/download/20100130212654891.pdf.

(Continued)

*Primary Examiner* — Regina N Holder
(74) *Attorney, Agent, or Firm* — Weide & Miller, Ltd.

(57) ABSTRACT

A noise or vibration detection system includes a clamping device with an audio transducer and a wireless transmitter. The transmitter transmits the audio signal, or a modified version of the audio signal, from the transducer. A mobile device located remote from the transmitter receives the transmitted audio signal for processing. The mobile device includes a receiver configured to receive the audio signal, a display configured as a user interface and to display information to a user, a memory configured to store non-transient machine executable code, and a processor configured to execute the machine executable code stored on the memory. The machine executable code is configured to process the received signal to form an audio signal which is presented to a speaker of the mobile device or a headphone port of the mobile device and also display the audio signal in graphical form on the display.

18 Claims, 28 Drawing Sheets

(56) References Cited

U.S. PATENT DOCUMENTS

| | | |
|---|---|---|
| 5,445,026 A | 8/1995 | Eagan |
| 5,659,303 A | 8/1997 | Adair, Jr. |
| 5,850,188 A | 12/1998 | Doyle et al. |
| 5,854,994 A | 12/1998 | Canada et al. |
| 6,175,787 B1 | 1/2001 | Breed |
| 6,230,029 B1 | 5/2001 | Hahn et al. |
| 6,259,372 B1 | 7/2001 | Taranowski et al. |
| 6,323,619 B1 | 11/2001 | El-Ibiary |
| 6,445,175 B1 | 9/2002 | Estep et al. |
| 6,654,631 B1 | 11/2003 | Sahai |
| 6,754,470 B2 | 6/2004 | Hendrickson et al. |
| 6,766,692 B1 | 7/2004 | Eagan |
| 6,825,758 B2 | 11/2004 | Laitsaari |
| 6,867,707 B1 | 3/2005 | Kelley et al. |
| 6,978,675 B2 | 12/2005 | Eagan |
| 7,004,907 B2 | 2/2006 | Banet et al. |
| 7,054,596 B2 | 5/2006 | Arntz |
| 7,161,476 B2 | 1/2007 | Hardman et al. |
| 7,181,146 B1 | 2/2007 | Yorks |
| 7,181,971 B1 | 2/2007 | Sauer et al. |
| 7,310,052 B2 | 12/2007 | Bowman |
| 7,605,485 B2 | 10/2009 | Pitchford et al. |
| 8,229,535 B2 | 7/2012 | Mensinger et al. |
| 8,289,182 B2 | 10/2012 | Vogel et al. |
| 8,433,543 B2 | 4/2013 | LeBrun |
| 8,463,953 B2 | 6/2013 | Davis et al. |
| 8,512,239 B2 | 8/2013 | Nelson et al. |
| 8,527,038 B2 | 9/2013 | Moon et al. |
| 8,545,415 B2 | 10/2013 | West |
| 8,576,276 B2 | 11/2013 | Bar-Zeev et al. |
| 8,618,928 B2 | 12/2013 | Weed et al. |
| 8,632,039 B2 | 1/2014 | Sugiyama et al. |
| 2008/0026357 A1 | 10/2008 | Mears et al. |
| 2010/0228111 A1 | 9/2010 | Friman et al. |
| 2010/0331645 A1 | 12/2010 | Simpson et al. |
| 2012/0150052 A1 | 6/2012 | Buchheim et al. |
| 2013/0007929 A1 | 1/2013 | Porthun |
| 2013/0148701 A1 | 6/2013 | Vink et al. |

OTHER PUBLICATIONS

Ahola, Tom; Korpinen, P. ; Rakkola, J. ; Ramo, T. ; Salminen, J. ; Savolainen, J., Wearable FPGA Based Wireless Sensor Platform, Nokia Res. Center, Helsinki Engineering in Medicine and Biology Society, 2007. EMBS 2007. 29th Annual International Conference of the IEEE, Date of Conference: Aug. 22-26, 2007, pp. 2288-2291.

SYSTEMS AND METHODS FOR IDENTIFYING NOISES WITH WIRELESS TRANSDUCER

1. PRIORITY CLAIM

This application claims priority to and the benefit of U.S. provisional patent application No. 62/056,372 filed on Sep. 26, 2014 and is a continuation-in-part from U.S. utility application Ser. No. 14/506,514 filed on Oct. 3, 2014, which claims priority to and the benefit of U.S. provisional application 62/002,756 filed on May 23, 2014 and U.S. provisional application 61/887,289 filed on Oct. 4, 2013.

2. FIELD OF INVENTION

The field of the invention relates generally to systems and methods for identifying noises, and more particularly, to systems and methods including a mobile device used to facilitate identifying unwanted noises, especially on vehicles.

2. BACKGROUND

Moving parts sometimes generate undesired noises. In addition to possibly being an annoyance to the people nearby, the noise may indicate a problem with the moving parts. This is especially true in ground-based vehicles like cars, where noises may emanate from moving parts, like axles and joints, as well as loose or damaged parts. Numerous other devices having moving parts also suffer from unwanted vibration and noise generation.

In many instances the vibration and resulting audible sounds are a sign of a lose part, an imbalance, or other unwanted abnormality. For example, most mechanical items, when new or adjusted properly do not make noise, rattle, squeak or otherwise vibrate. By detecting and correcting the vibration or noise, the operational life the mechanical system is extended.

However, it can be difficult to locate the source of the noise or vibration. For example, in the case of an automobile, traveling along a road can trigger the unwanted noise in a car but because of engine and road noise, the unwanted noise may be difficult to hear. The unwanted noise may also be intermittent and/or at a frequency that makes identifying the source difficult. Commonly, drivers might bring their car to a mechanic to diagnose the unwanted noise. To diagnose the problem, the mechanic may either drive the vehicle in an attempt to reproduce the noise or may rely on the often inaccurate description of the noise from the driver.

Even if the driver or mechanic is able to hear the noise when inside the cabin of the automobile, it is even more difficult to determine, with any precision, where the noise originates. The noise could be in the engine compartment or trunk, or from any number of automobile components. Several prior art system have been proposed to locate the noise, but the prior art devices suffer from several drawbacks caused by the limitations of the technology at the time of development of the prior art solutions. The prior art systems provided limited functionality and poor audio quality. In addition, prior art solutions required dedicated complex hardware that limited access to vibration diagnostic equipment.

Accordingly, there is a need for systems and methods for identifying noises, especially unwanted noises in vehicles.

SUMMARY

In one embodiment, an audio controller is provided. The audio controller includes an audio transducer interface that is capable of receiving multi-channel audio from one or more audio transducers and each of the audio transducers is associated with a channel. A channel selector is configured to receive the multi-channel audio from the audio transducer interface. A tone detector is configured to receive a tone from a mobile device (the tone being associated with a selected channel) and to cause the channel selector to output audio associated with the selected channel. A listening device interface is configured to transmit the audio output from the channel selector to a listening device.

In another embodiment, a system is provided that comprises one or more audio transducers and an audio controller. The audio controller includes an audio transducer interface that is capable of receiving multi-channel audio from one or more audio transducers and each of the audio transducers is associated with a channel. A channel selector is configured to receive the multi-channel audio from the audio transducer interface. A tone detector is configured to receive a tone from a mobile device (the tone being associated with a selected channel) and to cause the channel selector to output audio associated with the selected channel. A listening device interface is configured to transmit the audio output from the channel selector to a listening device.

In yet another embodiment, a method for changing channels using an audio controller is provided. The method includes receiving audio from one or more channels and receiving a tone from a mobile device. The tone is associated with a selected channel. The method further includes identifying the selected channel from the one or more channels based on the tone and transmitting audio from the selected channel.

In yet another embodiment, a method for changing channels on an audio controller is provided. The method includes receiving a user input associated with a selected channel. A tone is transmitted to the audio controller. The tone is associated with the selected channel. The method further includes receiving audio from the selected channel via the audio controller and processing the received audio.

In one embodiment, an audio controller is provided which includes an audio transducer interface that is capable of receiving multi-channel audio from one or more audio transducers such that each of the one or more audio transducers are associated with a channel. A channel selector is provided that is configured to receive the multi-channel audio from the audio transducer interface. A tone detector is configured to receive a tone from a mobile device such that the tone is associated with a selected channel. The tone detector is configured to cause the channel selector to output audio associated with the selected channel. A listening device interface is also provided that is configured to transmit the audio output from the channel selector to a listening device.

In one embodiment the audio controller comprises a processor configured to receive an indication of the selected channel from the tone detector and to cause the channel selector to output audio associated with the selected channel. The audio controller may further comprise a wireless interface configured to wirelessly transmit the audio output. In one configuration the audio controller further comprises a mobile device interface configured to transmit the audio output from the channel selector to the mobile device. The audio controller may further comprise a pre-amplifier configured to amplify the multi-channel audio from the audio transducer interface and to output the amplified multi-channel audio to the channel selector.

Also disclosed is a system that includes one or more audio transducers and an audio controller. The audio controller may include an audio transducer interface that is capable of receiving audio signals from one or more audio transducers such that each of the one or more audio transducers is associated with a channel. A tone detector is configured to receive a tone from a mobile device. The tone indicates a change in a selected channel to thereby change the selected audio signal. The tone detector is configured to transmit a channel change signal. Also part of this embodiment is a channel selector coupled to the audio transducer interface, the channel selector configured to receive the channel change signal, and in response, cause the channel selector to change which audio signal is the selected audio signal. The selected audio signal is sent to the mobile device. A listening device interface is also provided and configured to transmit the selected audio signal from the channel selector to a listening device.

In one embodiment, the audio controller further comprises a mobile device interface configured to transmit the audio output from the channel selector to the mobile device. The tone may be received from the mobile device over the mobile device interface based on user input which generates the tone. The mobile device may include a memory storing non-transient machine readable code configured as an audio recorder configured to record audio received from the audio controller. In one configuration, the mobile device further comprises an audio processor configured to process audio received from the audio controller such that processing audio comprises at least one of equalization, offset, and audio signal comparing to an audio signal library. The mobile device may include a memory storing non-transient machine readable code configured to transmit recorded audio to a remote location. The non-transient machine readable code may be configured to receive and display a diagnosis from the remote location.

Also presented is a method for changing channels using an audio controller that may comprise receiving audio from two or more channels and receiving a tone from a mobile device such that the tone is associated with a selected channel or indicating a channel change request. The method also identifies the selected channel from the two or more channels based on the tone and transmits audio from the selected channel or from a new channel to a user. In one embodiment, transmitting audio from the selected channel comprises transmitting the audio to the mobile device and to an audio interface for receipt by a user. This method may perform a switching operation in response to the channel change request.

Also disclosed is a method for changing channels on an audio controller. This method may include receiving audio signals from two or more channels where the audio signals are received from transducers connected to two or more locations of a machine. This method of operation then receives a user input at the audio controller to change and establish a selected channel, and performs a switching operation within the audio controller to electrically connect the selected channel to an output of the audio controller. Next, the method transmits the audio signal from the selected channel to the user and sends the audio signal from the selected channel to a mobile device. The mobile device may be configured to display one or more aspects of the audio signal.

Sending the audio signal may include sending the audio signal to a user either through a wired or wireless link. The received audio may be stored. Sending the audio signal from the selected channel to a mobile device may include sending the audio signal to an audio input port of the mobile device. In one embodiment, frequency equalization or magnitude offset to the audio signal may occur. The method may further comprise displaying a waveform of the audio signal from the selected channel on the mobile device.

Also disclosed herein is a detection system capable of detecting any type event, such as noise, vibration, temperature, or any other type event. In one embodiment, this system includes a clamping device configured to releasable attach to a monitored element and an audio transducer, attached to the clamp, that is configured to generate an audio signal responsive to noise or vibration associated with the monitored element. A wireless transmitter is associated with the clamping device such that the transmitter is configured to transmit the audio signal, or a modified version of the audio signal to a remote receiver. A mobile device is located remote from the transmitter and configured to receive the transmitted audio signal or modified version of the audio signal. In this embodiment, the mobile device includes the following elements. A receiver is configured to receive the audio signal, or a modified version of the audio signal to establish a received signal and a display is configured as a user interface and to display information to a user of the mobile device. A mobile device memory is configured to store non-transient machine executable code while a processor is configured to read and execute the machine executable code stored on the memory. The machine executable code is configured to process the received signal to form an audio signal, present the audio signal to a speaker of the mobile device or a headphone port of the mobile device, and display the audio signal in graphical form on the display of the mobile device.

In one embodiment, the audio transducer comprises a piezo detector. The wireless transmitter may include a battery, controller, and one or more lights configured to provide status information to a user. In one configuration the system further includes additional clamping devices with associated audio transducers and wireless transmitter, such that the wireless transmitters of the additional clamping device are configured to transmit signals to the mobile device. In one variation, transmitting to the mobile device by multiple wireless transmitters occurs concurrently. Furthermore, the currently transmitted audio signal or modified version of the audio signal results in multiple received signals, one of which is defined as an active signal and other received signals are muted. In one embodiment, the mobile device processor is configured to receive input from a user regarding equalization and perform equalization on the received signal or the audio signal according to the user settings prior to presenting the audio signal to the speaker or headphone port. The mobile device processor may be configured to perform FFT signal processing on the signal to display the frequency content of the received signal or audio signal to a user.

Also disclosed is a system for recording detected information from a remote location using a wireless transmitter. In this embodiment the system comprises a connector configured to attach to an element being monitored and a detector associated with the connector. The detector is configured to detect information and generate an electrical signal representing the detected information. A transmitter module is in electrical communication with the probe to receive the electrical signal from the detector and wirelessly transmit the detected information to a remote receiver. Non-transitory machine readable code is stored on a memory and executable by a processor. The machine readable code, upon execution by the processor, is configured to receive the detected information from a receiver and present the detected information to the user in graphical form on a display of an electronic device.

It is contemplated that the detected information may be the following types of information: sound, temperature, vibration, or pressure. In one embodiment, the machine readable code is further configured to process the detected information to generate an audio signal and present the audio signal to the user. In one configuration the transmitter module is detachable from the detector and connector. In one embodiment, the machine readable code is configured to accept input in the form of user settings from a user regarding equalization and perform equalization on the received signal according to the user settings. The machine readable code is configured to process the detected information and store the detected information on a memory.

Also disclosed is a method for detecting vibration or noise on a device. In one embodiment, this method comprises activating a wireless transmitter associated with clamp and connecting the clamp to a device to be monitored. Then, detecting vibration or noise with a detector associated with the clamp and generating an electrical signal representing the noise or vibration. A wireless transmitter receives the electrical signal representing the noise or vibration and transmits a wireless signal such that the wireless signal represents the vibration or noise. This method also includes the step of receiving the wireless signal at an electronic device to create a received signal. The electronic device includes a display, a user interface, a processor, and memory. The memory stores non-transitory machine readable code executable by the processor and the machine readable code is configured to process the received signal to generate an audio signal, present the audio signal to a speaker or headphone port of the electronic device, and process the received signal to present a graphical representation of the vibration or noise on the display.

This method may further comprise storing information regarding the noise or vibration on the memory of the electronic device to enable to noise or vibration to be audibly or graphically presented later in time. In addition, the step of present a graphical representation of the vibration or noise on the display includes performing a fast Fourier transform on the received signal to present information regarding frequency content of the vibration or noise on the display. This method may also include the step of receiving an additional wireless signal, representing additional vibration or noise, from an additional wireless transmitter and displaying a graphical representation of the additional vibration or noise on the display.

DETAILED DESCRIPTION

The systems and methods described herein facilitate the analysis of audio signals associated with a subject. The subject may be a vehicle such as a car, a rotatable device such as a turbine, or any other system or device with moving or movable components. Vibrations in the subject may cause, or itself be, audible noises that may indicate loose or misaligned components or other issues. In many cases, the noise is an annoyance. The subject matter described herein enables a user to identify the source of such noises by analyzing and comparing one or more audio sources.

The operating environment for the subject matter commonly includes a vehicle that has been brought to a technician in order to identify and eliminate a sound heard by a driver of the vehicle. The technician uses a device as described herein to analyze audio collected from various parts of the vehicle. More particularly, the technician may use the device to listen to the sounds collected at several locations on the vehicle. Without being limited to any particular method or theory of operation, by collecting sounds from various locations, the technician can hone in on the source of the sound for further diagnosis. By isolating and comparing the various audio sources, the systems and methods described herein boost the technician's ability to identify the source of sounds while using commodity mobile devices to aid in the process.

Figure 1:
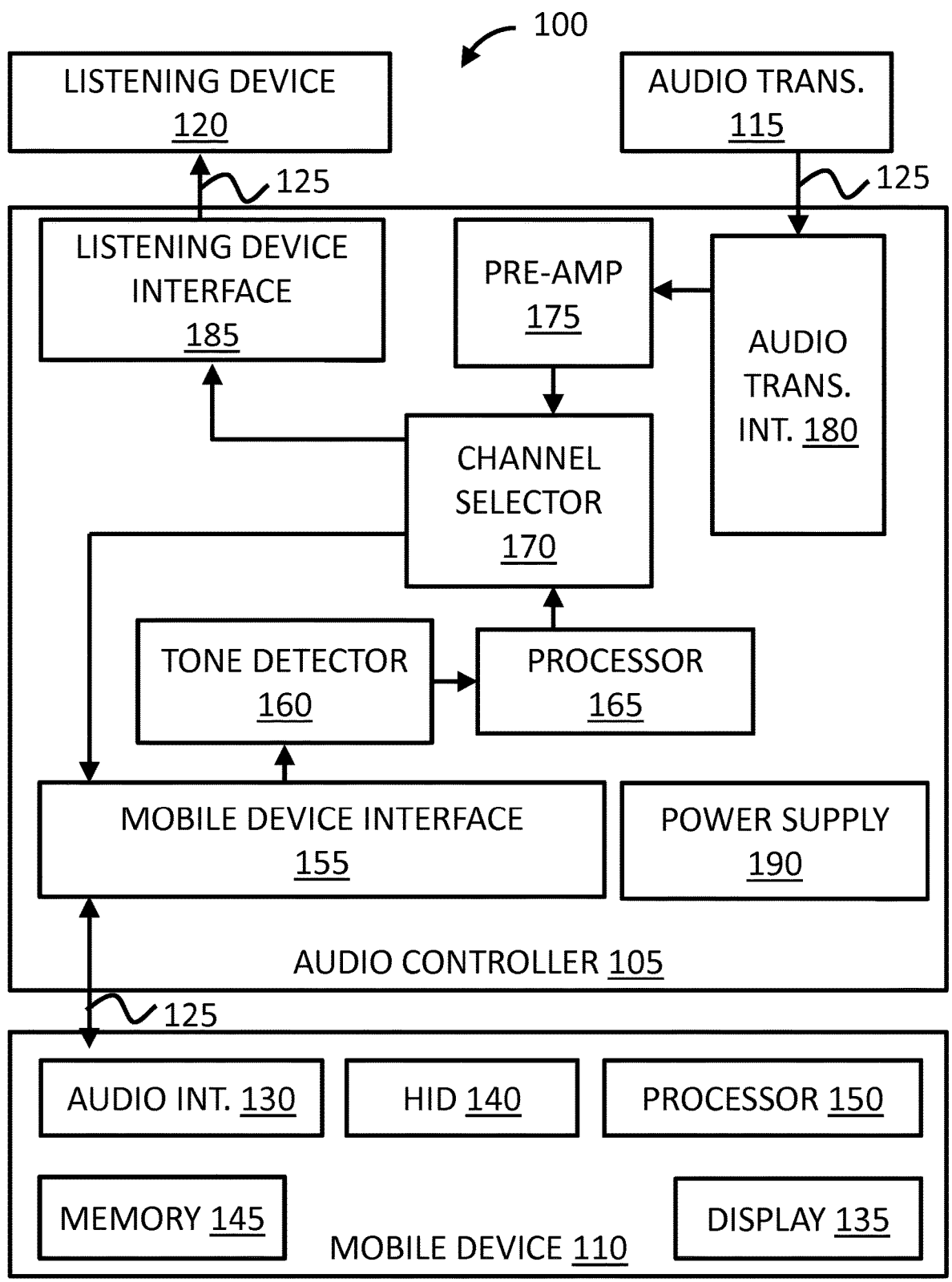
FIG. 1 is a block diagram of an exemplary system for identifying noises.

FIG. 1 is a block diagram of an exemplary system 100 for identifying unwanted sounds. The system 100 includes an audio controller 105, a mobile device 110, one or more audio transducers 115, and a listening device 120. In the exemplary embodiment, the audio controller 105 serves as a hub for the audio transducers 115, the listening device 120, and the mobile device 110 connected to it. Data or other signals may be transmitted through and/or routed by the audio controller 105. Alternatively, or additionally, two or more components of the system 100 may be communicatively coupled directly without the audio controller 105 intervening. For example, the listening device 120 may be directly coupled with the mobile device 110.

Additional components, not shown in FIG. 1, may be present in the system 100. Some of the components shown in FIG. 1 may not be present in all embodiments of the system 100, and some components may be combined together. For example, the mobile device 110 may not be present in embodiments where the audio controller 105 includes functionality similar to the mobile device 110. In another example, the listening device 120 may not be present if the mobile device 110 is configured as a listening device.

The components of the system 100 may be communicatively coupled using one or more communication links 125. The communication links 125 may be point-to-point or configured in any topology and may be uni- or bi-directional. The communication links 125 may be distinct and heterogeneous. In other words, each of the communication links 125 may use a different communication medium. The communication links 125 may be wired or wireless, including communications by wires, fiber optics, infrared, radio waves, etc. Wireless variations may include use of Bluetooth, Wi-Fi, and other radio frequency-based communications. Bluetooth is a registered trademark of Bluetooth SIG, Inc., and Wi-Fi is a registered trademark of the Wi-Fi Alliance. For example, the communication link 125 between the audio transducers 115 and the audio controller 105 may be long wires that enable the audio transducers 115 to be placed in various locations on a vehicle while the audio controller 105 remains inside the vehicle.

The mobile device 110 may be a smart phone, tablet, portable computer, or any other kind of computing device. The operating system may be iOS, Android, Windows, or any other type operating system. In the exemplary embodiment, the mobile device 110 includes an audio interface 130, a display 135, at least one human interface device (HID) 140, a memory 145, and at least one processor 150. The audio interface 130 may include a combined input and output port, such as a 3.5 mm connector. The display 135 and at least one input device 140 may be combined as a touch screen device.

The audio transducers 115 may be any sensor that converts vibrations, whether sound waves, mechanical vibrations, or otherwise, into electrical signals. The audio transducers 115 may be distinct and heterogeneous, meaning that not all transducers are necessarily the same. For example, one audio transducer 115 may be a microphone while another audio transducer 115 is an accelerometer.

The listening device 120 includes at least one speaker for transmitting sounds from the system 100. The listening device 120 may be headphones or a car radio, among other things. The listening device 120 may transmit sounds collected by the audio transducers 115 in real-time and/or may transmit such sounds as recorded by the system 100 and/or as modified by the system 100. For example, the mobile device 110 may record and play back sounds from the audio transducers 115 and may filter or otherwise modify the sounds. Filtering may be helpful in isolating the vibration from road noise or other known noises.

In the exemplary embodiment, the audio controller 105 includes a mobile device interface 155, a tone detector 160, a processor 165, a channel selector 170, a pre-amplifier 175, an audio transducer interface 180, a listening device interface 185, and a power supply 190. The various components of the audio controller 105 may be communicatively coupled as shown in FIG. 1 or otherwise. Various buses (shown, but not numbered) connect the components and may be digital or analog. Additional buses not shown may provide power from the power supply 185 to the various components. The power supply 190 may include a battery (not shown) and/or a power input (not shown), either or both of which may power the audio controller 105. The power input may charge the battery.

The mobile device interface 155 is configured to communicatively couple with the mobile device 110. More particularly, the mobile device interface 155 enables audio, whether digital or analog, to pass bi-directionally between the audio controller 105 and the mobile device 110. In one embodiment, the mobile device interface 155 includes a male 3.5 mm male plug for coupling to the audio interface 130 of the mobile device 110. In another embodiment, the mobile device interface comprises a Bluetooth connection, or other wireless standard, to communication audio or data to the mobile device 110. It is also contemplated that the listening device interface 185 may comprise a wired or wireless link to communicate audio to a user or listener. For example, Bluetooth headphones may be used as the listening device 120 and are thus paired to the listening device interface 185, which may include a wireless transmitter.

In order to communicate control information from the mobile device 110 to the audio controller 105, the mobile device 110 is configured to generate audio tones that each have a pre-determined association with a control command. Thus, the audio link between the audio controller 105 and the mobile device 110 may be used to send control data. The tone detector 160 is configured to receive audio input from the mobile device 110 and determine whether and which audio tones were received from the mobile device 110.

In the exemplary embodiment, the audio tones are used to indicate which channel (i.e., which audio transducer 115) should be used by the audio controller 105. A channel may be indicated by the tone using the frequency, pulses, duration, and/or any other audio characteristic of the tone. More generally, the audio tones may be used to communicate control commands and/or other data. For example, the tones may be used to instruct a Bluetooth module to enter pairing mode or the tones may be used to communicate an ASCII string of characters to the Bluetooth module to set the broadcast name of the module.

The tone detector 160 is configured to transmit an instruction to the processor 165 based on the received audio tones. The instruction may be as simple as which channel should be selected. The processor 165 receives and carries out the instruction, sometimes after executing additional logic. In the exemplary embodiment, the processor 165 is configured to transmit a channel selection to the channel selector 170 indicative of the channel selected by the mobile device 110. For example, if there are six available channels, the channel may be indicated by a three-bit encoded instruction to the channel selector 170.

The channel selector 170 is configured to receive the channel selection from the processor 165 and selectively output an audio signal from the selected channel. In the exemplary embodiment, there are six audio transducers 115 connected to the audio controller 105 via the audio transducer interface 180. Alternatively, any number of audio transducers 115 may be used. The connection may be made by 3.5 mm connectors. In some embodiments, the connection is wireless, e.g., by RF signal, including Bluetooth. Each of the audio transducers 115 is connected to the channel selector 170 via the pre-amplifier 175, which is configured to amplify the signal from each audio transducer 115. The channel selector 170 is therefore configured to output the amplified audio from the selected audio transducer 115. The channel selector 170 may include relays, a signal decoder, and/or other components in order to operate as described herein.

The audio output by the channel selector 170 is received by the listening device interface 185 and the mobile device interface 155. From the listening device interface 185, the audio is transmitted to the listening device 120 via one of the communication links 125. In the exemplary embodiment, the listening device 120 is headphones connected to the listening device interface 185 via Bluetooth. From the mobile device interface 155, the audio is transmitted to the mobile device 110 via one of the communication links 125. In the exemplary embodiment, the audio is received by the mobile device at a microphone input, which is combined with the headphone output. Accordingly, both the listening device 120 and the mobile device 110 receive audio via the audio controller 105 from the selected audio transducer 115.

During operation, a user places one or more audio transducers 115 at desired locations of the subject (e.g., a vehicle). The transducers 115 may be clamped or otherwise affixed, usually temporarily, to or near components suspected of causing undesired noises. The transducers 115 are communicatively coupled with the audio controller 105, usually by wires terminated by 3.5 mm connectors. The mobile device 110 and the listening device 120 are also communicatively coupled with the audio controller 105. At this point, the subject is operated (i.e., is driven, in the case of a car) to induce the undesired noises.

The user selectively listens to the audio transducers 115 by indicating to the mobile device 110 which channel, or audio transducer 115, is desired. The mobile device 110 transmits a tone corresponding to the selected channel to the tone detector 160, which detects the tone and sends an instruction to the processor 165. The processor 165 causes the channel selector 170 to switch to the desired channel, resulting in audio from the desired transducer 115 being transmitted to the listening device 120. The channel selector may comprise a switch. The user may listen to each channel in turn, and compare the audio from the various transducers 115 in order to determine the source of the undesired noise. By isolating each channel, the undesired noise is more readily identified and located.

Figure 2A:
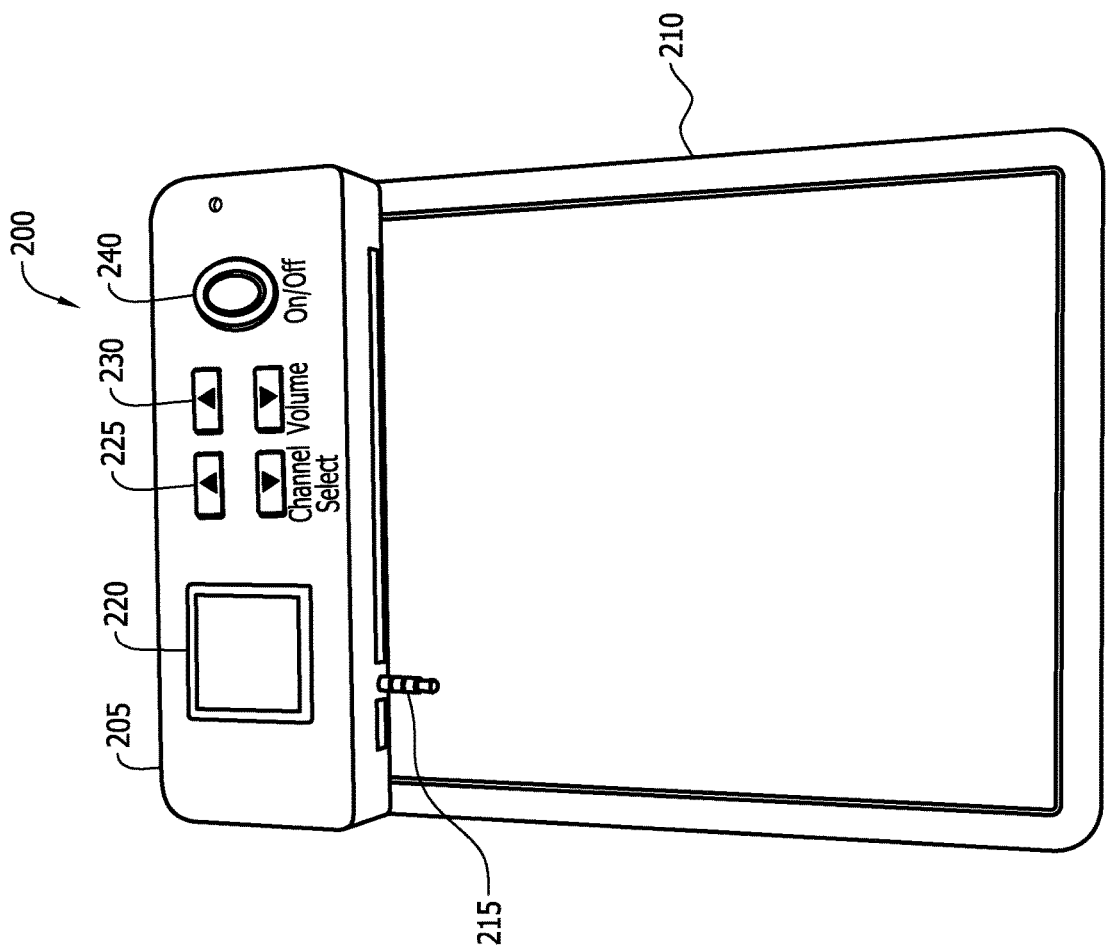
FIGS. 2A and 2B illustrate an exemplary audio controller for use with a tablet and the system of FIG. 1.
Figure 2B:
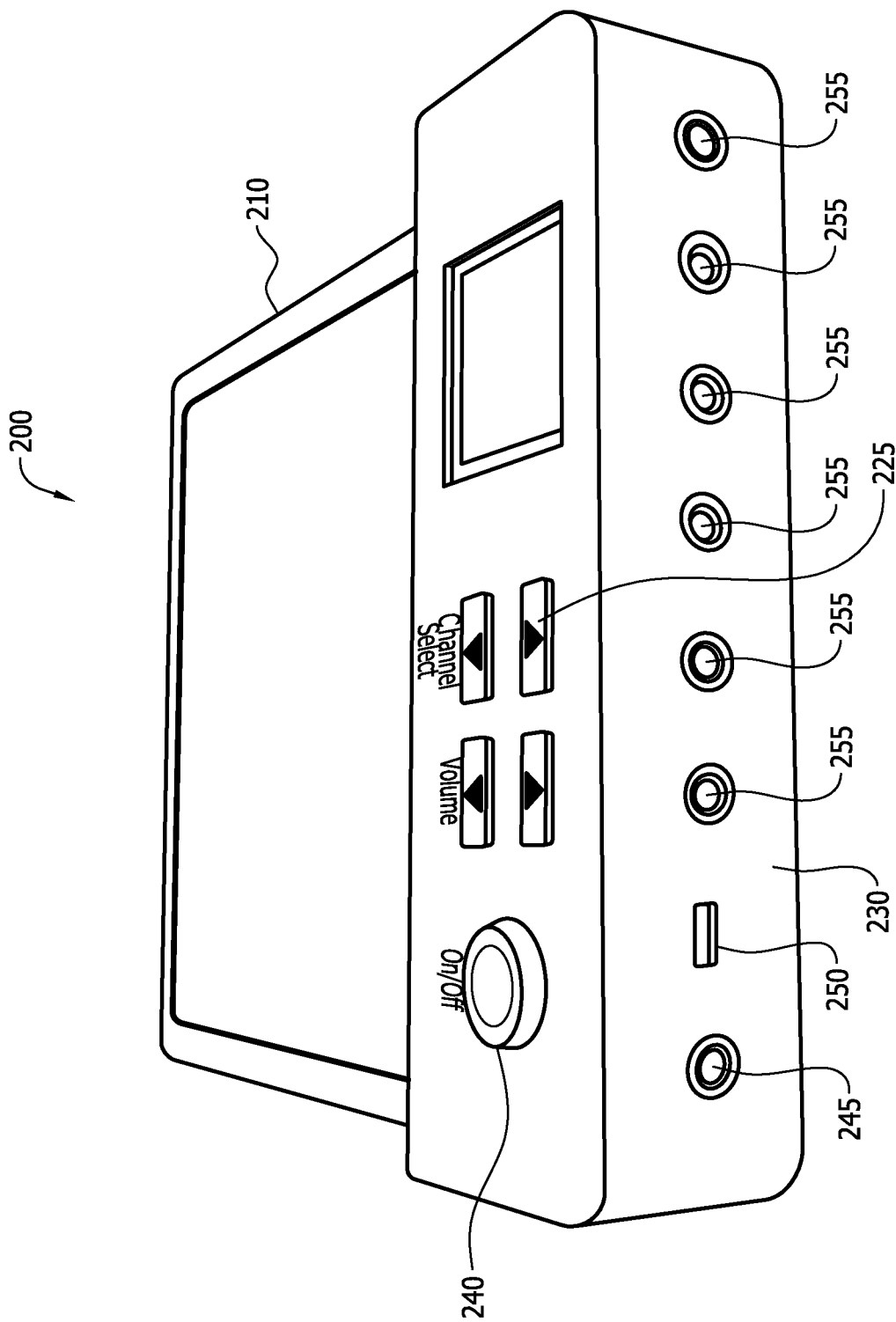

FIGS. 2A and 2B illustrate an exemplary audio controller 200 for use with a tablet. The audio controller 200 of FIGS. 2A and 2B may be similar to the audio controller 105 of FIG. 1 and similar components are labeled using the same reference characters. Although a tablet is described as the mobile device 110, other mobile devices 110, including smart phones, may be used with the audio controller 200.

The audio controller 200 includes a housing 205 and a base 210. The housing contains the electronics and other components associated with the audio controller 200. The base 210 provides support to the mobile device and facilitates alignment between the mobile device and the housing 205. More particularly, a male connector 215 provides a connection between the mobile device interface 155 (not shown) of the audio controller 200 and the audio interface 130 (not shown) of the mobile device.

In this embodiment, the housing 205 may include a display 220, channel selectors 225, volume controls 230, and a power button 240. The display 220 may display the on/off status of the audio controller 220 and/or the currently selected channel. The channel selectors 225 and the volume controls 230 may each include up and down buttons. In some embodiments, the housing 205 does not include one or more of the display 220, channel selectors 225, volume controls 230, and the power button 240. In other embodiments, the display 220, the channel selectors 225, and the volume controls may be configured as part of the mobile device such that these features are configured to be displayed on the screen through the use of machine readable code, also referred to as software, or processor executable code, which executes on a process of the mobile device. For example, the user may use one or more buttons of the mobile device, or a touch screen interface of the mobile device to display information regarding the docking station status, channel, volume, battery, or any other matter. In addition, the one or more buttons of the mobile device, or a touch screen interface of the mobile device may be used to adjust the volume, change or select channels, or any other function of the docking station or software described herein. In such an embodiment, The housing 205 may also include a headphone jack 245 for connection with a listening device, such as the listening device 120, a charging port 250, which may be a Universal Serial Bus port, and one or more audio transducer ports 255. Each of the audio transducer ports 255, which may be 3.5 mm jacks, is associated with a channel and is coupled to the audio transducer interface 180 (not shown).

Figure 2C:
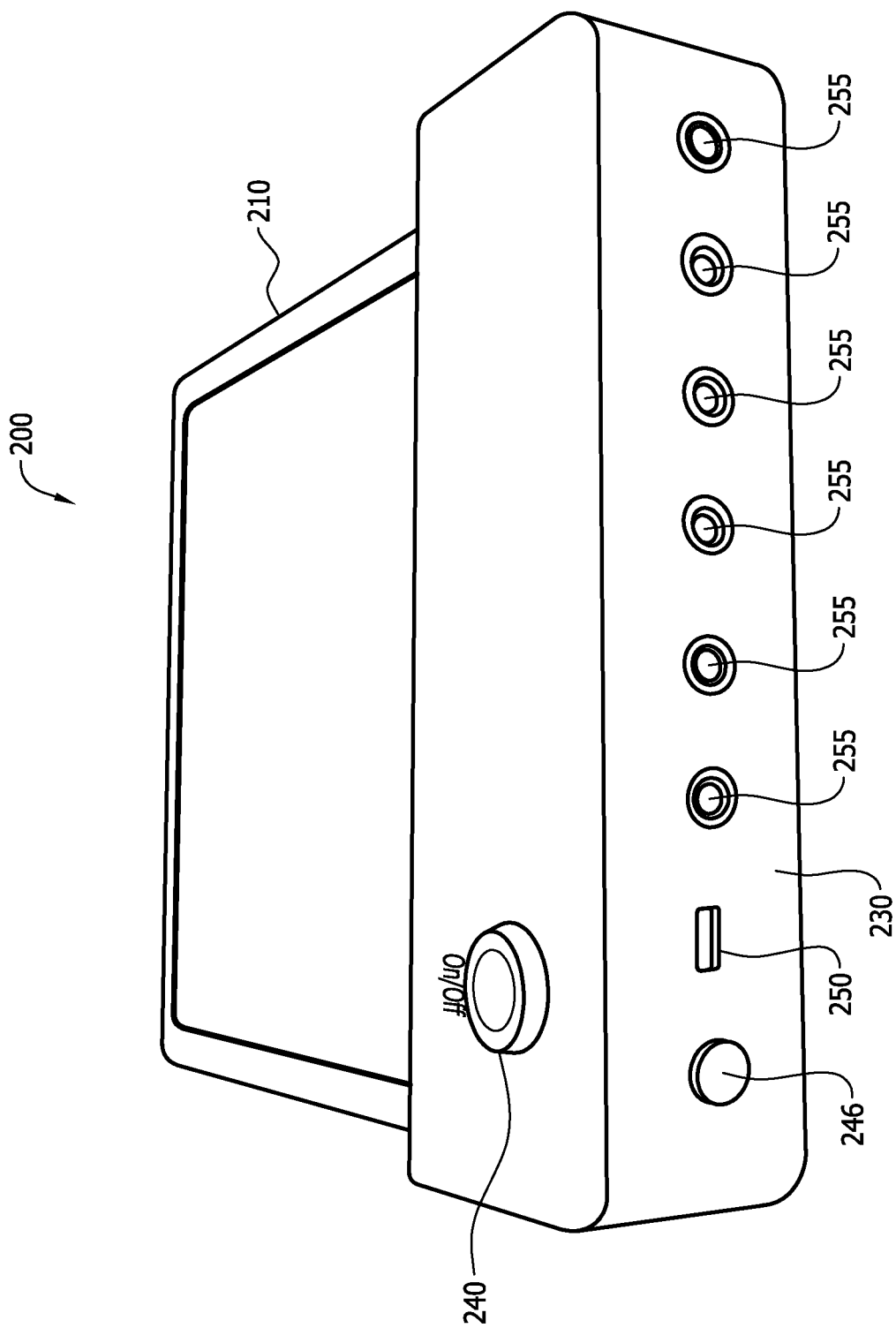
FIG. 2C is an alternative embodiment of the audio controller with certain functionality embodied in the mobile device with associated software.

FIG. 2C is an alternative embodiment of the audio controller with certain functionality embodied in mobile device and associated software. As shown in FIG. 2C, an optional embodiment includes the volume control, channel select, and display functions as part of or handled by the mobile device, such as a smartphone or tablet. As compared to FIG. 2A, 2B, like elements are labeled with identical reference numbers and are not discussed again. In this embodiment, a button 246 is provided to reset or pair the docking station 200 to either reset the docking station or for pairing the docking station with wireless headphone, such as a bluetooth pairing function. As such, the headphone connector port is not present in this embodiment.

Figure 3A:
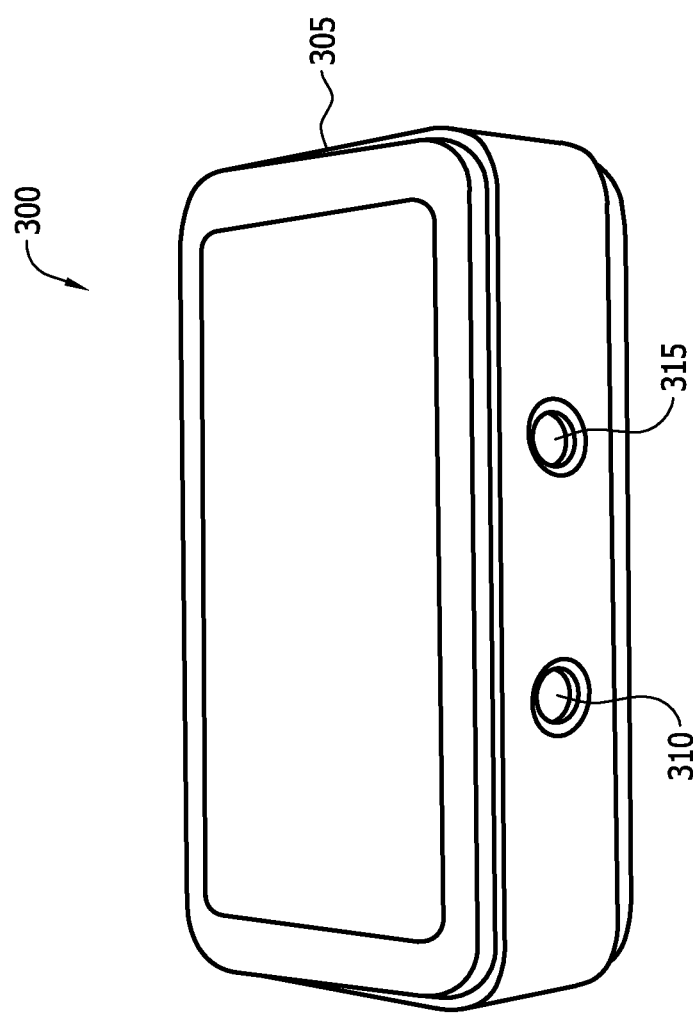
FIGS. 3A and 3B illustrate an exemplary audio controller for use with a smart phone and the system of FIG. 1.
Figure 3B:
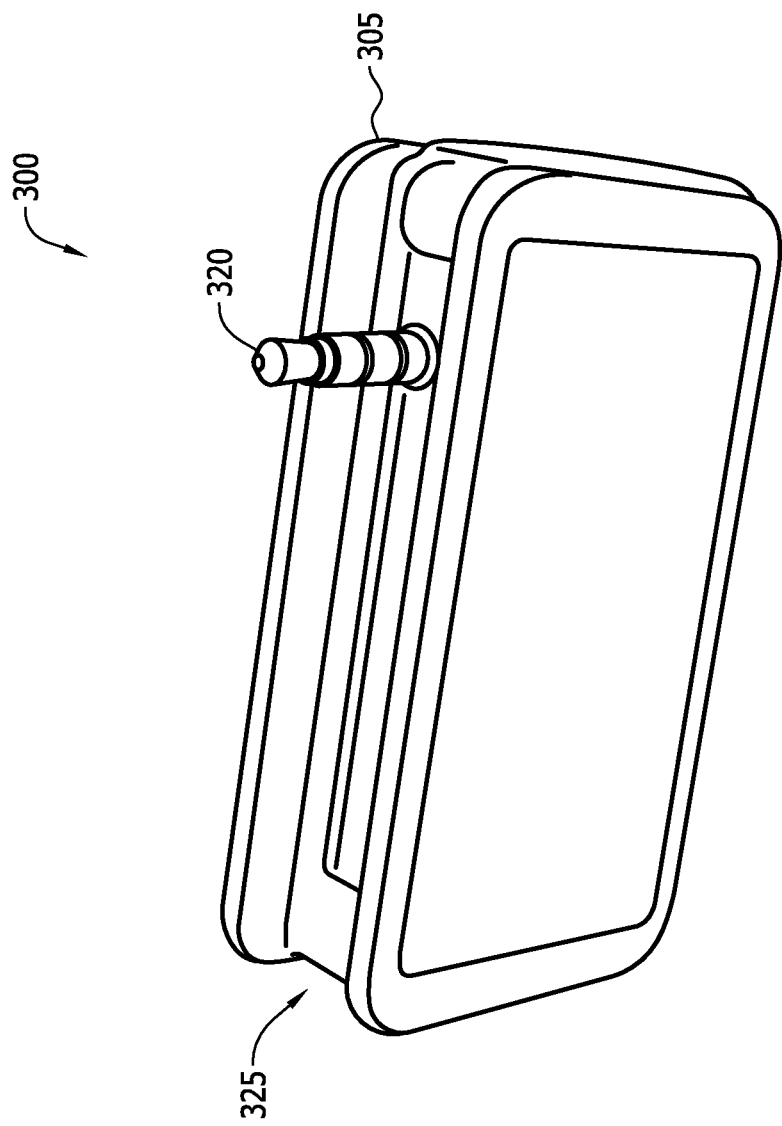

FIGS. 3A and 3B illustrate an alternative audio controller 300. The audio controller 300 includes a housing 305. The housing 305 may include a headphone jack 310 for connection with a listening device, such as the listening device 120. In another embodiment, the headphone case may not be present and the audio may be sent wirelessly to the wireless headphone. The housing 305 may also include one or more audio transducer ports 315. Each of the audio transducer ports 255, which may be 3.5 mm jacks, is associated with a channel and is coupled to the audio transducer interface 180 (not shown). A male connector 320 provides a connection between the mobile device interface 155 (not shown) of the audio controller 300 and the audio interface 130 (not shown) of the mobile device.

The housing 305 may also include a channel 325 that is sized to accommodate a mobile device, such as a smart phone. The channel 325 facilitates a physical coupling between the housing 305 and the mobile device.

Figure 4A:
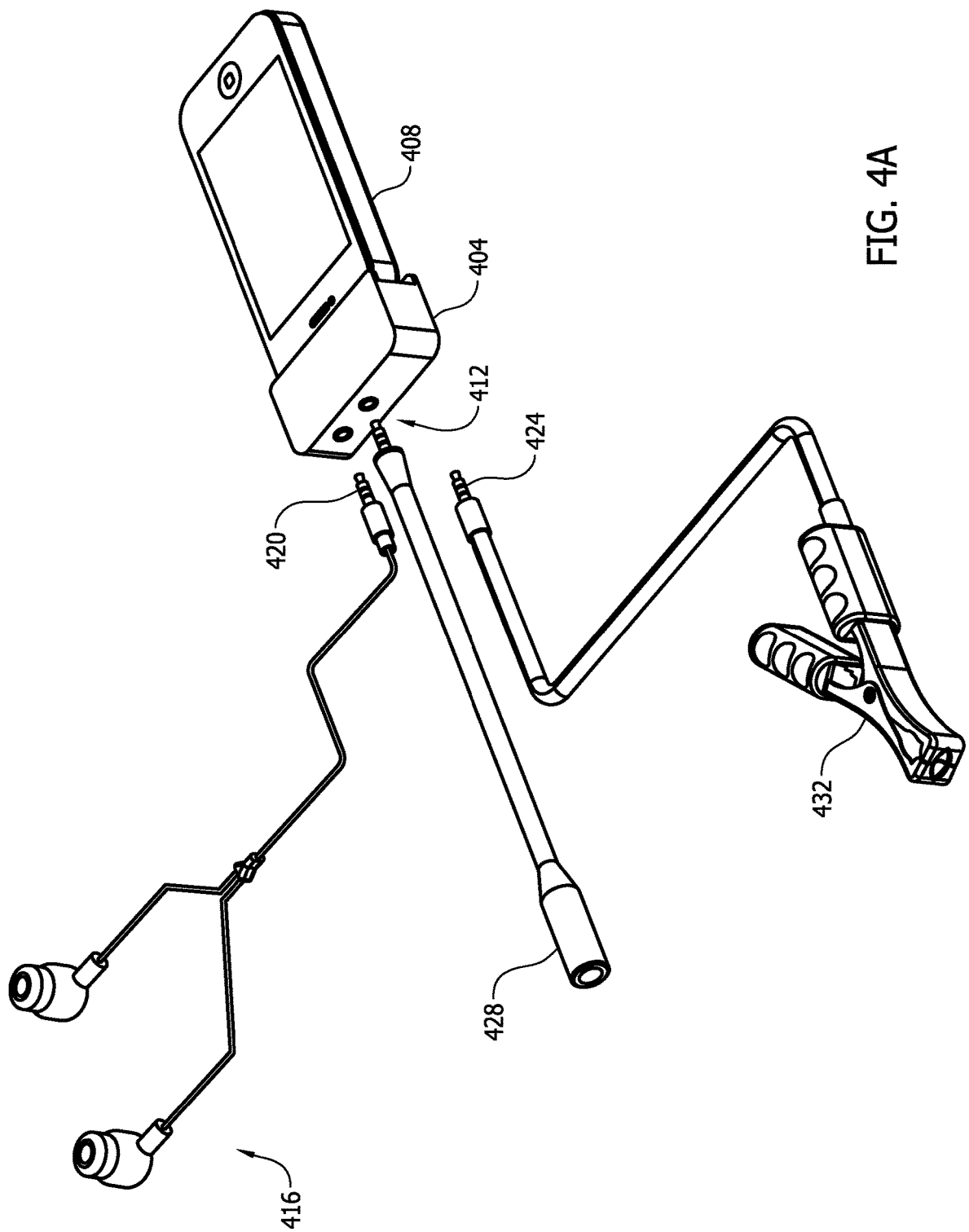
FIG. 4A illustrates exemplary audio transducers for use with a first type audio controller.

FIG. 4A illustrates exemplary audio transducers for use with a first type audio controller. In FIG. 4A, an audio controller 404 connects to a mobile device 408 which in this embodiment is a smartphone but could also be a tablet. The audio controller may connect to the mobile device through the mobile device's audio port.

One or more input/output ports 412 are on the audio controller 404. One input/output port 412 is a headphone or speaker port to which headphones 416 could connect using a standard headphone plug 420. In other embodiments, a wireless link may be established between the audio controller 404 and headphones 416, such as a Bluetooth link and wireless headphones 418 (see FIG. 4B). Also connecting to the audio controller 404 are one or more sensors configured to detect vibration, sounds, or other input. The sensor may comprise a microphone, piezo detector, vibration sensor, or other element being monitored. These sensors may include a probe 428 which the user may point or physically touch to a location for monitoring, or a clamp 432 with a sensor associated with the clamp. The probe 428 may be placed in contact with an area of interest, and may be moved as the user listens to the audio in order to hear different areas. The probe 428 may be removably coupled to a handle (not shown) that also has a connection port that includes wiring to pass through signals from the probe 428. The handle facilitates easier manipulation of the probe 428. The handle may not be necessary when the probe 428 is coupled directly to the audio controller 404.

A clamp 432 having a plug 424 may also be connected to a port 412. The clamp may connect to a location to be monitored, such as under a vehicle, and the cable connected to the clamp may be extended into the vehicle and plugged into the audio controller 404. The vehicle may then be driven while a user monitors for sound.

Figure 4B:
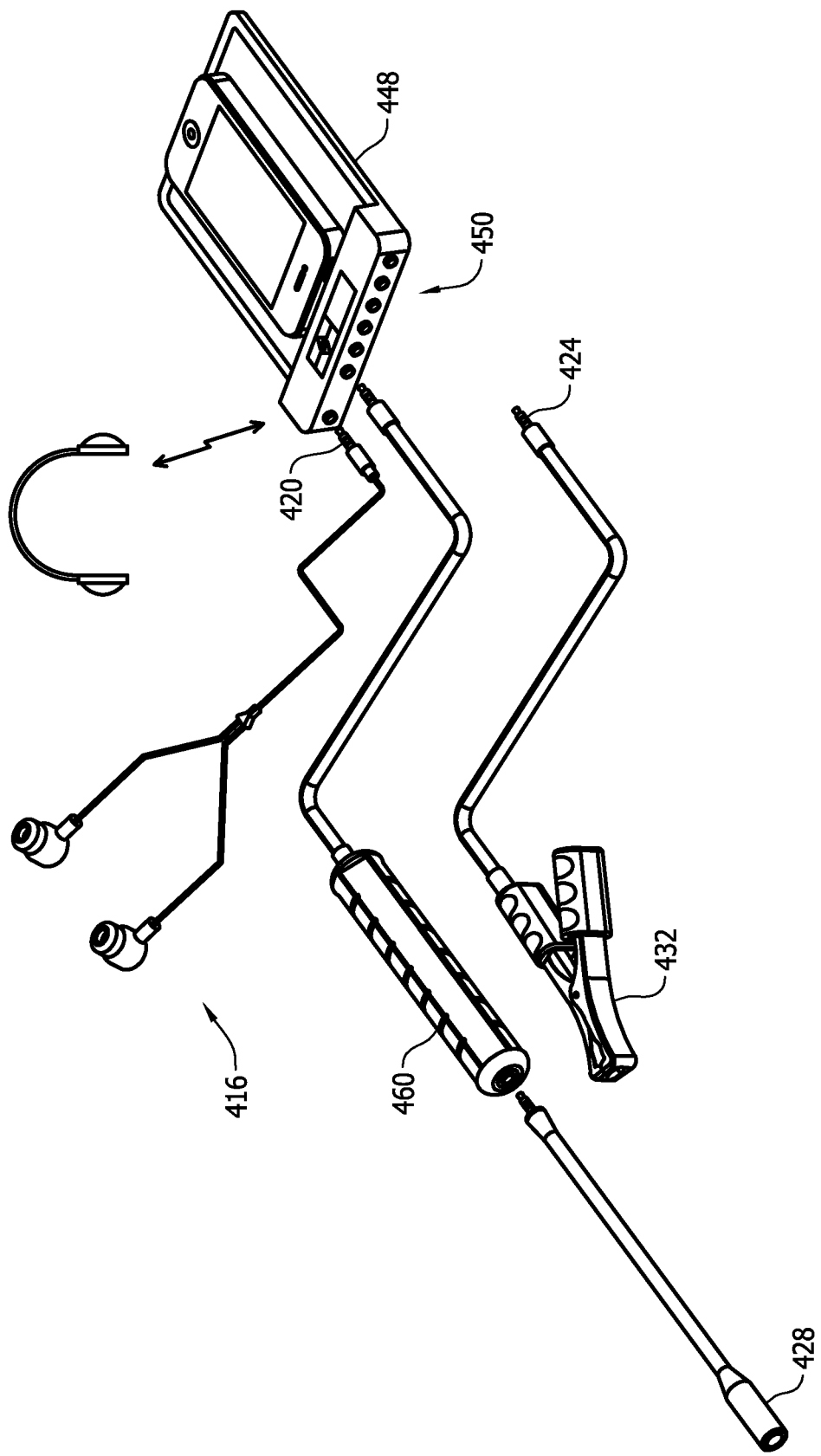
FIG. 4B illustrates exemplary audio transducers 400 for use with a second type audio controller.

FIG. 4B illustrates exemplary audio transducers for use with a second type audio controller. As compared to FIG. 4A, similar elements are labeled with identical reference numbers. Elements discussed in FIG. 4A are not discussed again in FIG. 4B. In this embodiment, the audio controller 448 is presented which has multiple channel input ports 450. It is contemplated that multiple sensors, such as clamp sensors 432 may connect using connector 424. Although only shown with one clamp, as many clamps may be connected as there are ports 450 to enable multi-channel operation. The audio controller 448 may be larger than the audio controller 404 of FIG. 4A and have one or more user input buttons or screens as discussed herein for the user to select a channel. Alternatively, the user may use the mobile device to select or change a channel. Also shown in this embodiment is a handle 460 between the probe 428 and the ports 450. The user may hold onto the handle 460 when using the probe 428. If the probe 428 contacts a moving part and is pulled into the machine, the probe will quickly and easily disconnect at the handle port connection thereby preventing the user or other parts of the system from being pulled into the machine.

Figure 5:
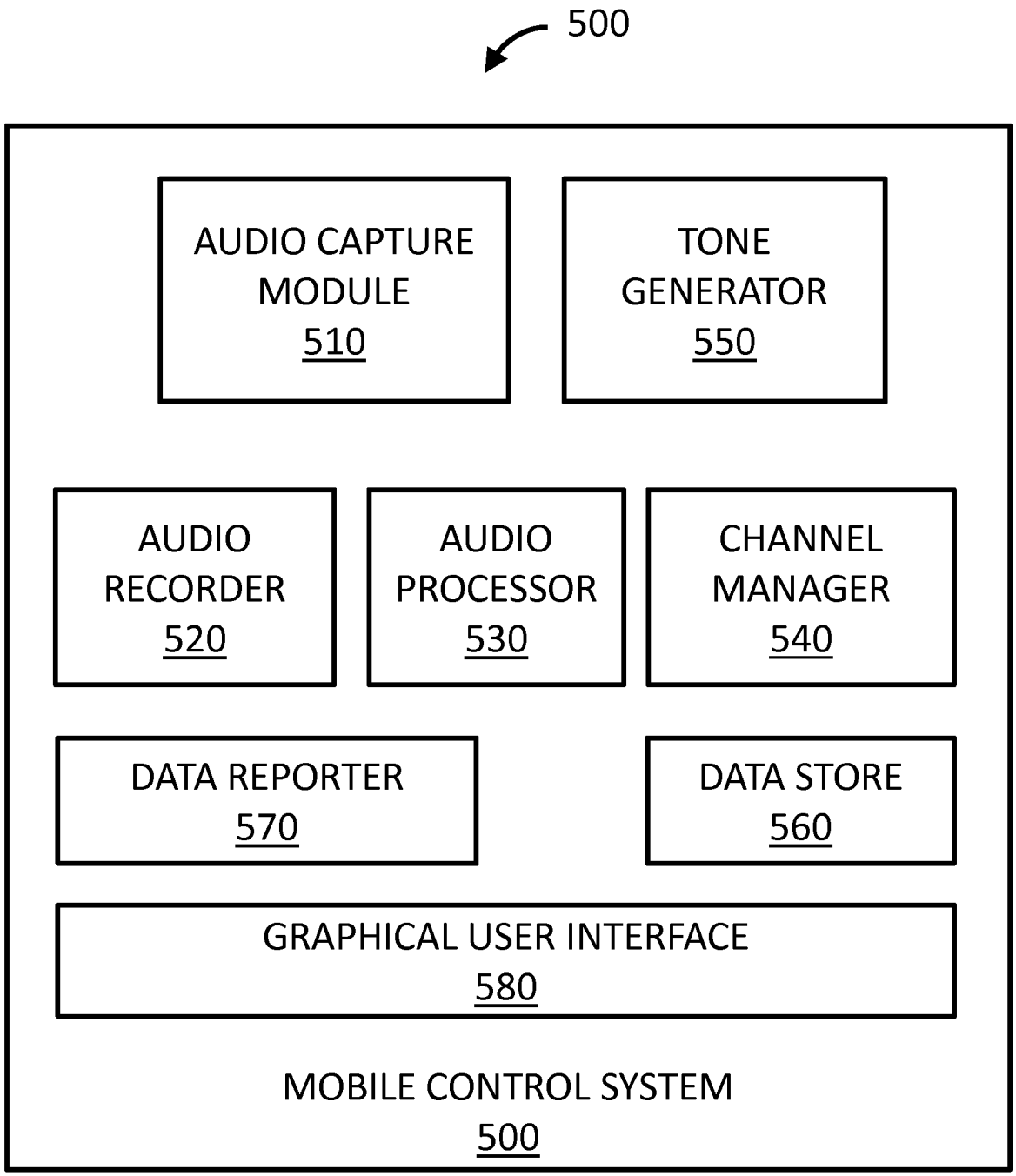
FIG. 5 is a block diagram of an exemplary mobile control system for use with the system of FIG. 1.

FIG. 5 is a block diagram of an exemplary mobile control system 500 for use with the system 100 of FIG. 1. The mobile control system 500 includes an audio capture module 510, an audio recorder 520, an audio processor 530, a channel manager 540, a tone generator 550, a data store 560, a data reporter 570, and a graphical user interface 580. The mobile control system 500 may be implemented as software and/or hardware on a mobile device, such as mobile device 110. For example, the mobile control system 500, including computer-readable instructions, may be stored in the memory 145, which may be non-transitory, and executed by the processor 150 (shown in FIG. 1). The graphical user interface (GUI) 580 is used to display information to the user and receive inputs using, for example, the display 135 and the human interface device 140 (also shown in FIG. 1). The data store 560 may be any database, file storage, and/or other data storage format or system now known or later developed.

Figure 8:
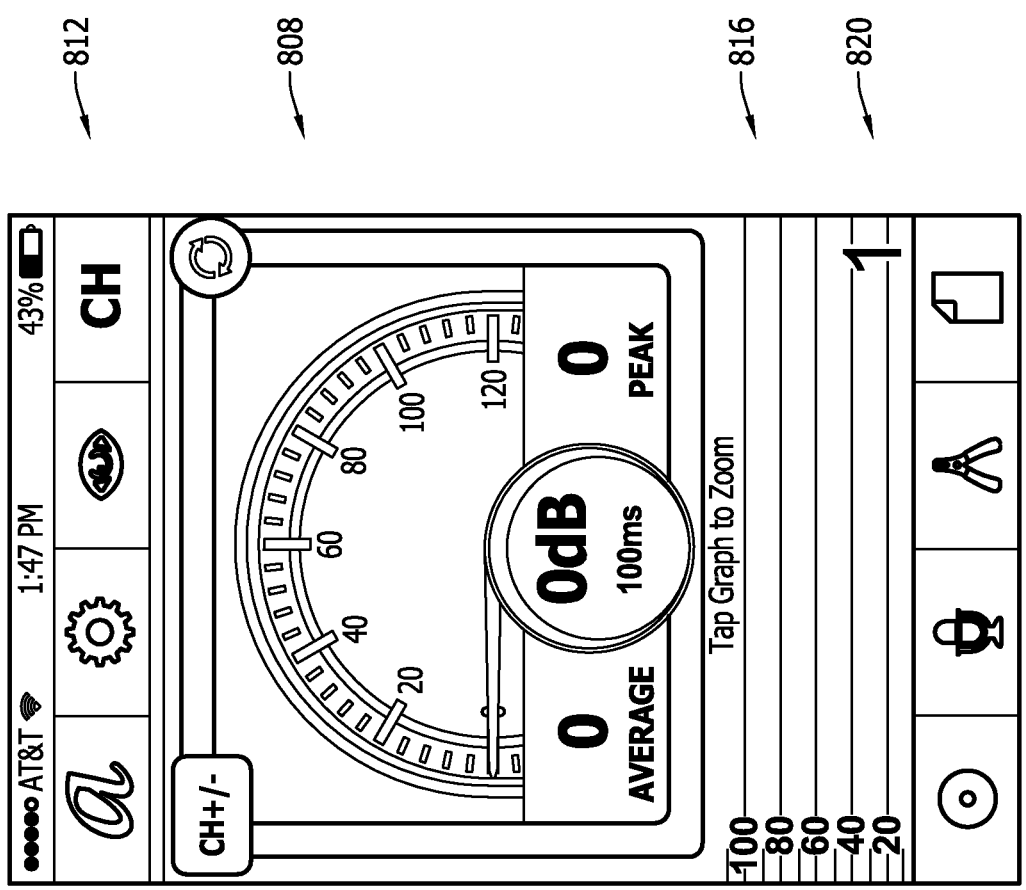
FIG. 8 is a screen shot of an exemplary graphical user interface for use with the mobile control system of FIG. 5.

FIG. 8 illustrates an exemplary screen shot of the graphical user interface 580. The GUI 580 may include a decibel meter 808, which may include peak and/or average decibel readings. The GUI 580 may also display a waveform area 816 to display audio signals when in use, which may also include a visual representation of peaks and/or averages in amplitude. A channel indicator 820, in this figure channel 1, may also be shown. The GUI 580 may also include a visual representation of a vehicle and the user may identify the location of audio transducers, or channels, relative to the vehicle on the visual representation. A menu bar 812 may be presented in this exemplary screen shot to access other features and screen as are discussed below.

The graphical user interface 580 is configured to accept a channel selection from the user. The user may select a channel from a list, using up/down arrows, etc. The user may associate a label or name with each channel, and the name together with the associated channel may be stored in the data store 560. For example, the user may label channel 3 "front left axle" because it is associated therewith. The graphical user interface 580 is configured to transmit the channel selection to the channel manager 540, which may also be responsible for labeling the channels.

The channel manager 540 is configured to instruct the tone generator 550 to generate a tone, or signal, associated with the selected channel such that the audio controller 105 switches to the selected channel. The tone generator 550 is configured to generate tones corresponding to channels and transmit the generated tones to the audio controller 105 via the mobile device audio interface 130.

The audio capture module 510 is configured to receive audio from the audio controller 105, shown in FIG. 1. The audio received by the audio capture module 510 is generally the audio received by the audio transducers 115, and more particularly, the audio received by the audio transducer 115 associated with the selected channel. The audio recorder 520 may record the captured audio and store it in the data store 560. The audio recorder 520 may be configured to play back recorded audio using a listening device associated with the mobile device, such as a speaker or headphones. The listening device associated with the mobile device may be wirelessly connected to the mobile device, using, for example, Bluetooth.

The audio processor 530 is configured to process, analyze, filter, and/or otherwise manipulate the captured audio from the audio capture module 510. The audio processor 530 may operate on captured audio in real-time as it is received, and/or it may operate on audio recorded by the audio recorder 520. The audio processor 530 may process audio before it is played through the listening device connected to the mobile device and/or before a sound wave representative of the audio is displayed via the graphical user interface 580.

The audio processor 530 may transform the captured audio in any manner now known or later developed. The user may select a processing method and provide inputs or settings to the processing method using the graphical user interface 580. As an example, the audio processor 530 may perform a Fourier transform, including a Fast Fourier transform, on the captured audio to produce a frequency spectrum. The frequency spectrum may be displayed by the graphical user interface 580. As another example, the audio processor 530 may filter the captured audio by frequency, amplitude, or other audio characteristics.

The audio processor 530 may facilitate identifying the source of undesired noise by comparing audio from multiple channels. The audio processor 530 may compare recorded audio and/or audio captured in real-time. For example, the audio processor 530 may cause two or more sound wave representations to be shown via the graphical user interface 580. The user may identify, from the overlaid waves, which channel produces a unique waveform and/or which channel produces a waveform having the greatest amplitude, either of which may indicate the source of the undesired noise. Alternatively, or additionally, the audio processor 530 may compare the audio from two or more channels and identify the likely source of the undesired sound based on the amplitude, frequency, or other relative characteristics of the sound waves. The identified channel may be displayed using the graphical user interface 580.

The data reporter 570 is configured to transmit captured audio, whether stored in the data store 560 or otherwise, to a remote host (not shown) via a network (not shown), such as the Internet. The audio may be compressed, placed in an audio file container, transcoded, down-sampled, or otherwise processed before transmission. Information about the channel or channels associated with the captured audio, including channel names, may be transmitted with the captured audio.

Transmitting the captured audio to a remote host enables further processing and analysis of the captured audio. For example, the remote host may be associated with a mechanic, and the mechanic may play back the transmitted audio to facilitate diagnosis of the problem. In another example, the captured audio may be sent to an auto manufacturer or other party, which may maintain a database of known problem sounds. The remote host may compare the transmitted audio with audio in the database to determine if the audio is similar to audio associated with known problems. The transmitted audio may, for example, be similar to audio in the database associated with a loose tailpipe. Sound waves, or representations of sound waves including hashes, may be used to compare the transmitted audio with the audio in the database. The channel name associated with the transmitted audio may also be used to match against words or phrases associated with known problems in the database. The make and model of a vehicle may also be transmitted with the captured audio and may be used in the diagnosis, whether the diagnosis is performed by a human or the remote host.

The data reporter 570 is configured to receive a report back from the remote host. The report may include a possible diagnosis, from either a person or a problem sound database. The contents of the report may be displayed using the graphical user interface 580.

Figure 6:
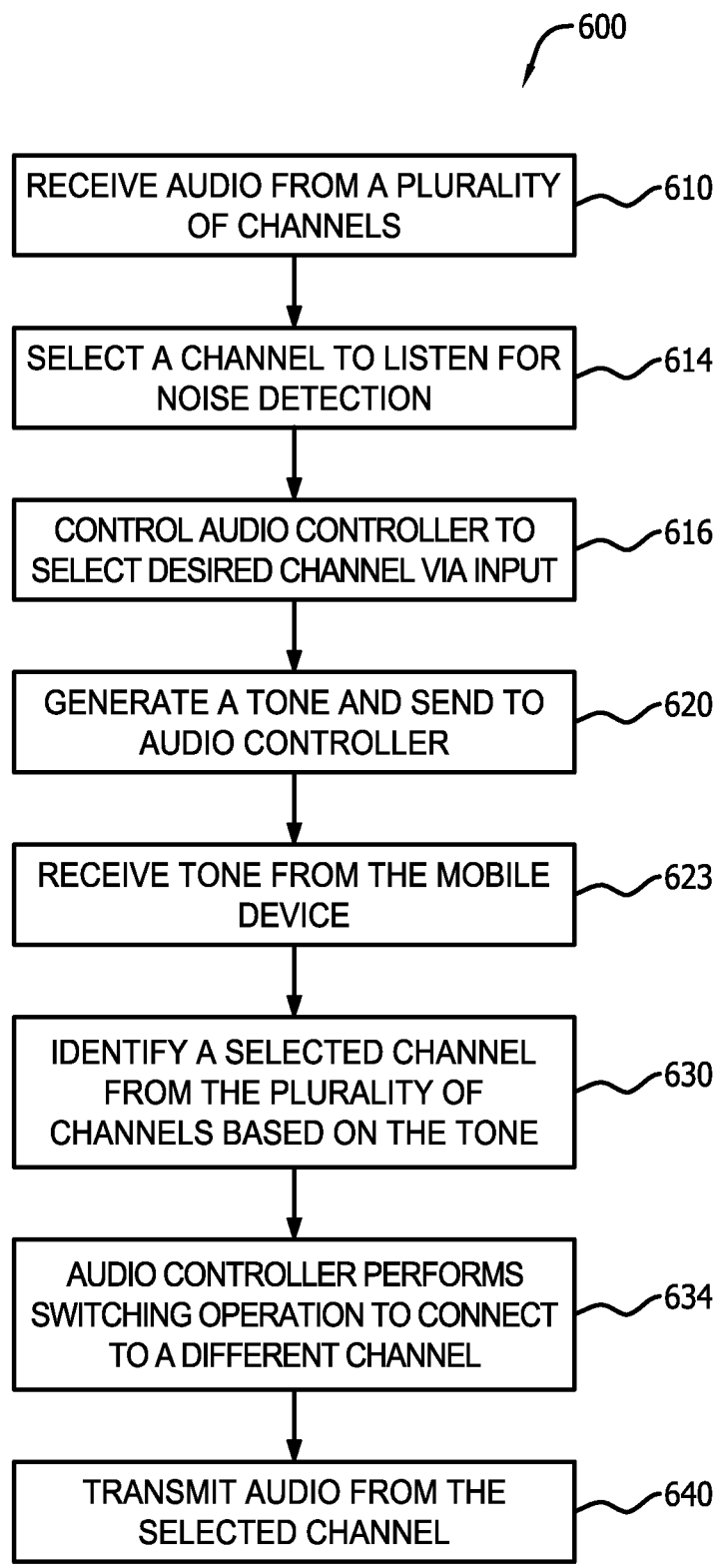
FIG. 6 is a flowchart of an exemplary method for use with the system of FIG. 1.

FIG. 6 is a flowchart of an exemplary method 600 for use with the system 100 of FIG. 1. In step 610, an audio controller 105 (such as a smartphone or tablet), receives audio from one or more channels. More particularly, the audio controller receives audio from one or more audio transducers, e.g., audio transducers 115. After listening to a channel, at a step 610, the user may advance to step 614 and elect to listen to a different channel as part of the noise detection operation. To make this change, the user, at a step 616, presses or actuates a button on the audio controller or selects a different channel using a graphical interface on the software presented on the mobile device. For example, if the mobile device has a touch screen, the user may touch a displayed button or tab to select a different channel. The following discussion focusses on the embodiment of the user interfacing with a mobile device to have changed the channel.

At a step 620, the mobile device, after receiving the input from the user to change channel generates a tone and sends the tone outward through the audio port of the mobile device to the audio controller. In one embodiment, the tone or command may be sent through the data port, of the mobile device data port if the mobile device audio port is used to communicate with the audio controller. It is contemplated that a unique tone is associated with each channel. In another embodiment, a single tone is used to indicate a change in channel, such that each time the single tone is used the channel will increment or decrement. It would also be possible to send a code, or DTMF, or any other combination of signals which could be detected and decoded at the audio controller.

At a step 622, the audio controller receives the tone from the mobile device. It may be received through the electrical or wireless connection over which the audio controller communicates with the mobile device. At a step 630, the audio controller processes the one or more tones with an internal tone detector's other element to determine and identify the selected channel. If the user were to press a button on the audio controller to select a different channel (instead of using the mobile device software interface), pressing the button would cause the audio controller to select a different channel.

At a step 634 the audio controller performs a switching operation to connect another and different channel's signal (from transducer/microphone/vibration detector) to the output of the audio controller to thereby provide this different channel's audio signal to the mobile device. This may occur with a physical or integrated circuit switch operation. As discussed above, while the audio controller may have numerous channels from the transducers, it may have a few numbers, such as one, of audio outputs to the mobile device. As a result, an internal controlled switching operation within the audio controller selectively connects an input to the output based on user selections.

In step 640, the audio controller transmits audio from the selected channel to the mobile device and/or a listening device such as headphones. Thus, the audio controller changes input channel based at least in part on a tone received from a mobile device.

Figure 7:
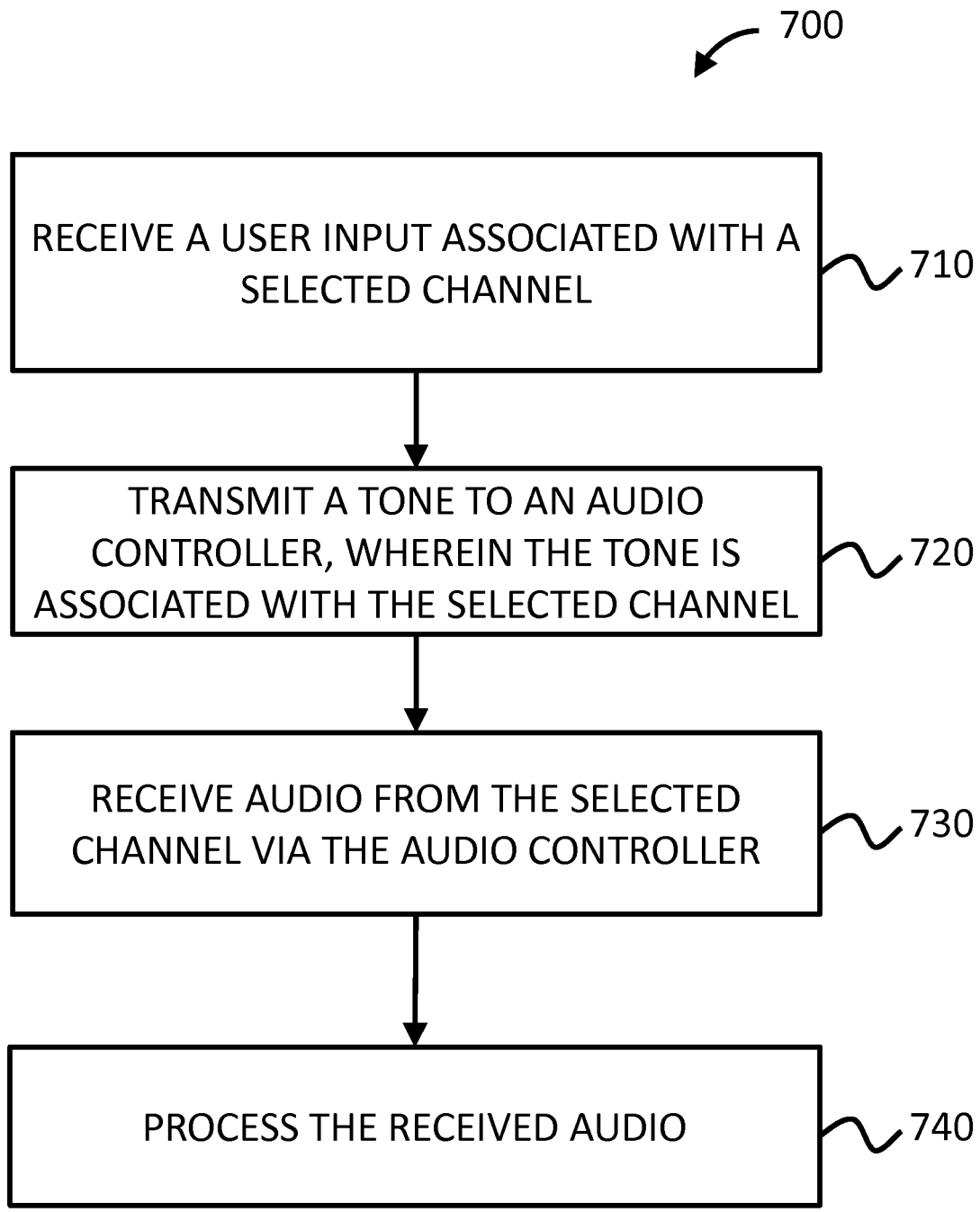
FIG. 7 is a flowchart of an exemplary method for use with the system of FIG. 1.

FIG. 7 is a flowchart of an exemplary method for use with the system 100 of FIG. 1. In step 710, a mobile device, such as the mobile device 110, receives a user input associated with a selected channel. The user input may be received through a graphical user interface, such as the graphical user interface 580, shown in FIG. 5. In step 720, the mobile device generates and transmits a tone to an audio controller, such as the audio controller 105 shown in FIG. 1. The tone is associated with the selected channel. The tone may be pre-recorded or generated.

In response to the tone, the audio controller switches input channels to the selected channel. In step 730, the mobile device receives audio from the selected channel via the audio controller. In step 740, the mobile device processes the received audio. More particularly, the mobile device captures and records and/or performs audio processing on the received audio, as described herein. Thus, the mobile device is capable of changing the channel on the audio controller using a tone generated by the mobile device.

Figure 9A:
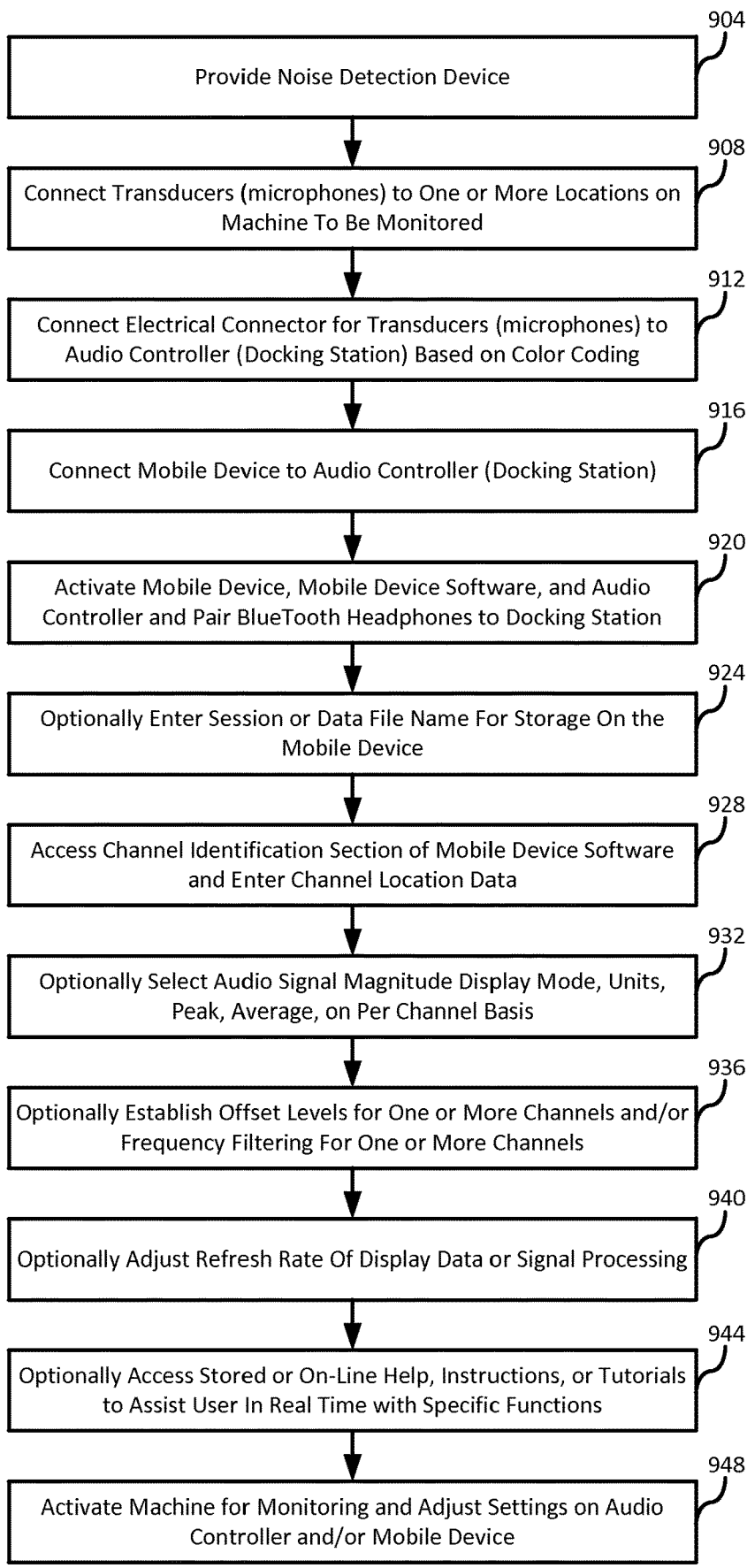
FIGS. 9A and 9B illustrate an exemplary flow diagram of an example method of operation.
Figure 9B:
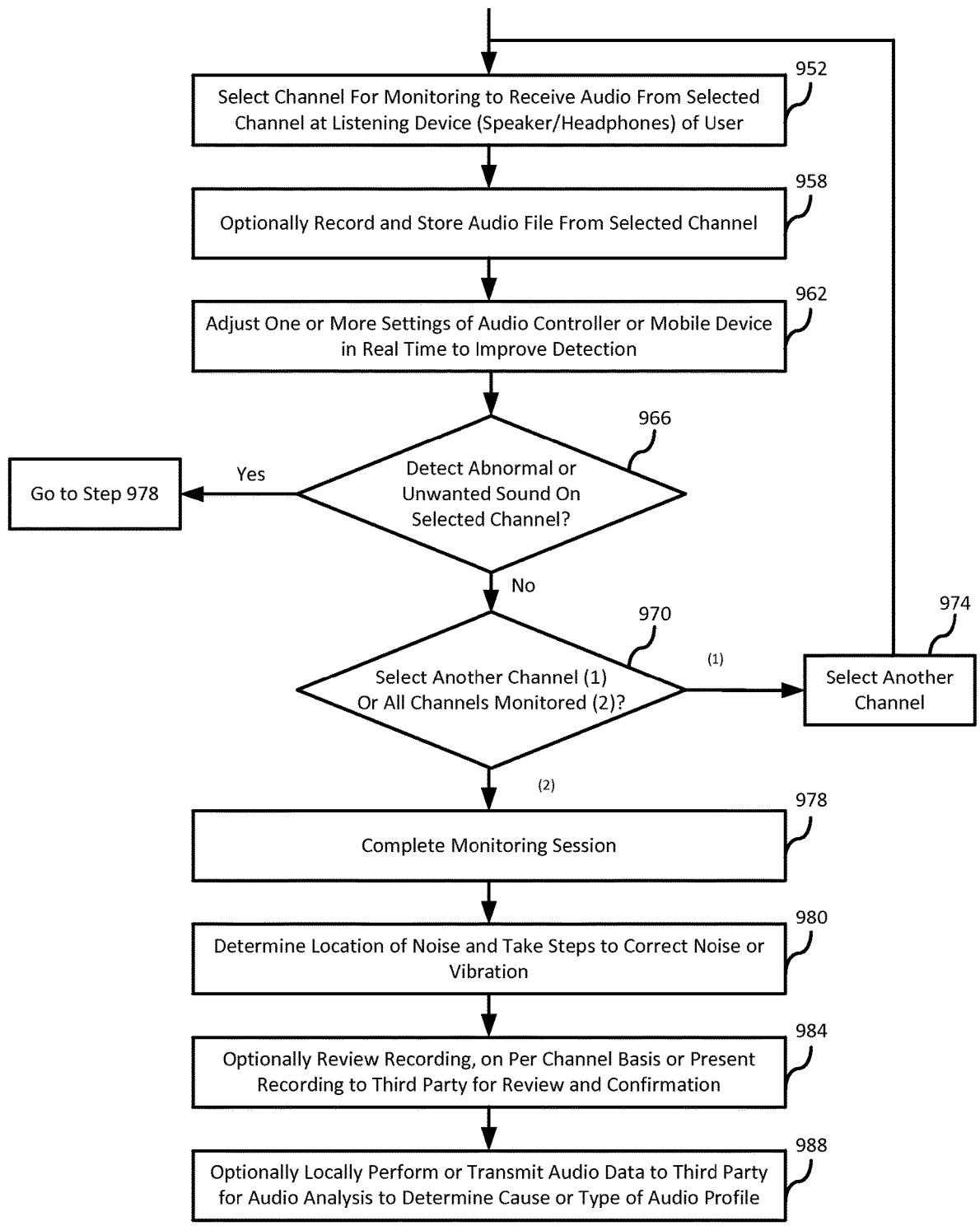

FIGS. 9A and 9B illustrate an exemplary flow diagram of an example method of operation. This is but one possible method of operation and use. In other embodiments or in other applications, different methods of use may be utilized. It is contemplated that this method of operation may be utilized with any of an audio controller that is a single channel unit or a multiple channel unit, or with a smartphone or table device. The method of operation may be performed with any number of channels.

At a step 904, the noise detection system is provided. The noise detection system comprises one or more of a transducer, audio controller, and a processing device, such as a smartphone or tablet. The processing device may be provided as part of the system or provided by a user of a system. At a step 908, the user connects transducers, such as microphones or piezo vibration sensors, to the machine or other element being monitored. Connection may occur through clamping, taping, magnets, wraps, or by the user manually pointing or touching the transducer to the area to be monitored.

At a step 912, the user electrically connects the transducers to the audio controller. This may occur by plugging a connector into one or more ports on the audio controller. There may be multiple connectors and ports or a single connector and port. At a step 916 the user connects the mobile processing device to the audio controller. The audio controller may be considered a docking station to which the mobile processing connects. In one embodiment, the connection is through an audio port of the mobile device. In one embodiment, the connection is through a data port of the mobile device.

At a step 920, the user activates the mobile device, mobile device software, and the audio controller, and also pairs the Bluetooth headphones with the docking station. Bluetooth, or other types of wireless pairing, is known in the art and thus not described in detail. This may occur in any specific to the devices and software. The software is considered to be machine executable code capable of being stored in memory and executed by a processor. At a step 924, the user may optionally enter a session name or file name to store the monitoring. To do this the user may be presented with a file name entry screen or provide an option to save the session.

At a step 928, the user may optionally access the channel identification section of the mobile device software and enter channel location data. This may occur by the software presenting data entry fields for each channel into which a user may type text or numbers. For example, the user may enter the term front wheel well for channel 1 to designate the channel 1 transducer is connected to this location. This data may be stored for a final report or to aid analysis.

Figure 10:
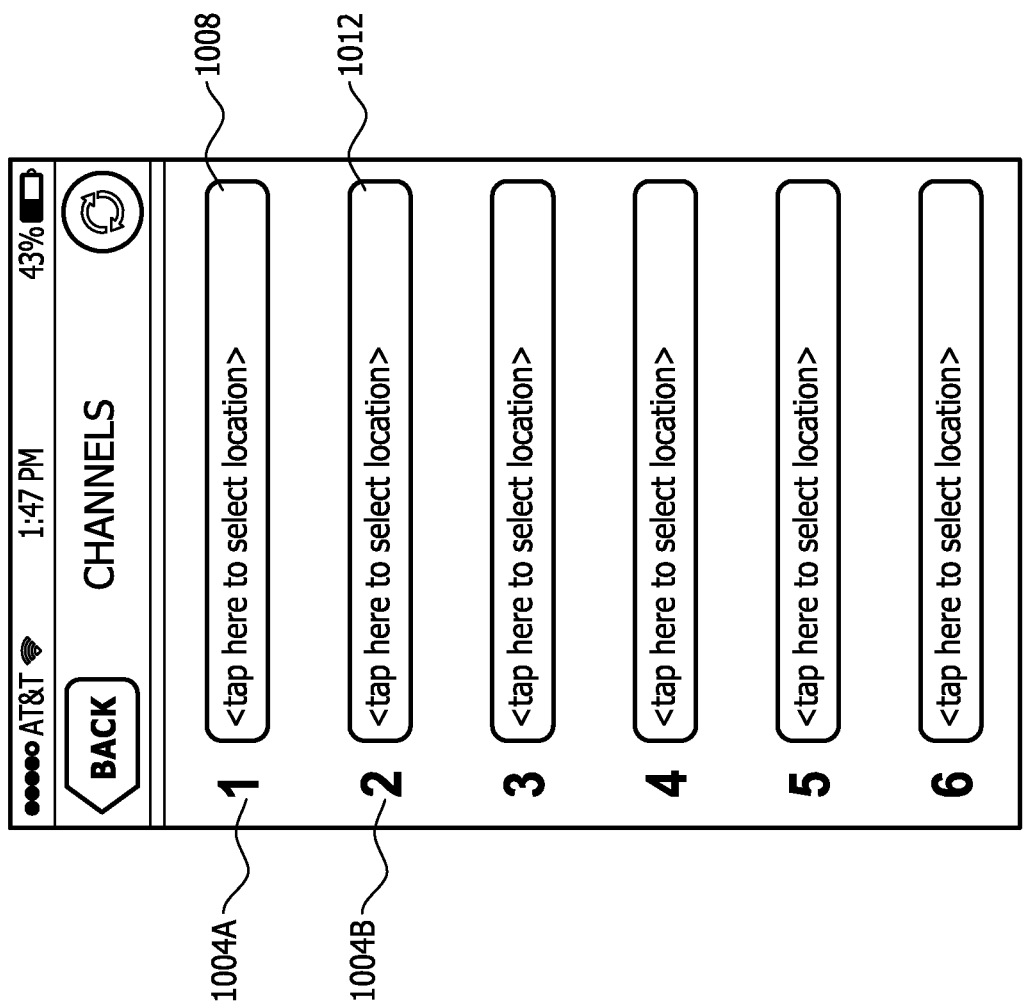
FIG. 10 is an exemplary screen shot of a channel identification screen presented by the software.

FIG. 10 is an exemplary screen shot of a channel identification screen presented by the software. As shown, channel identifiers 1004A, 1004B are shown with associated text entry fields 1008, 1012. By tapping on or otherwise selecting a text entry field 1008, 1012 a user may enter a location (such as fender, or shock absorber) at which the transducer is located.

At a step 932, the user may optionally set signal magnitude display mode, units, peak signal values, average signal values for the display for one or more channels. For example, the user may establish the software to display the detected signal in various ways, such as peak magnitude or average magnitude. The units in which the data is displayed are also adjustable by the user.

Figure 11:
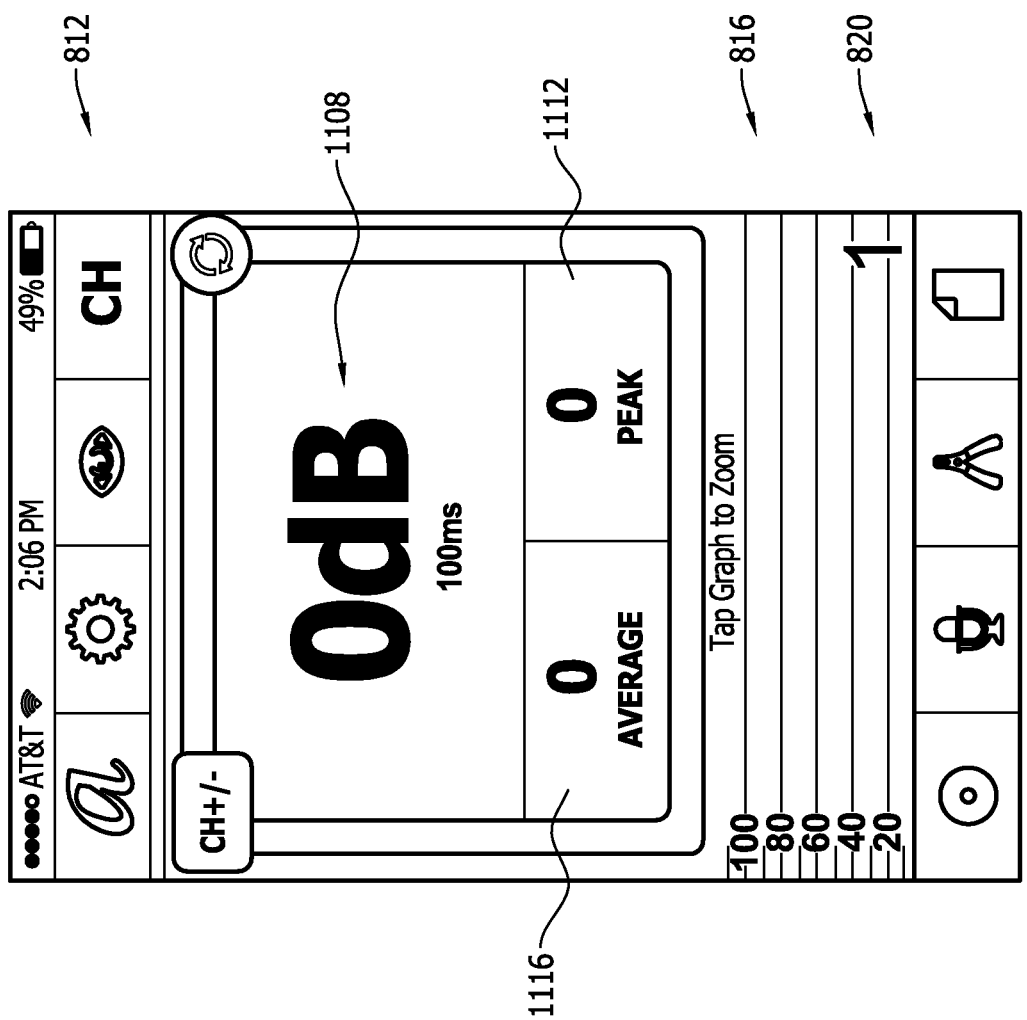
FIG. 11 is an example screen display presented by the software for displaying information regarding the audio signal to the user.

FIG. 11 and FIG. 8 are an example screen displays presented by the software for displaying information regarding the audio signal to the user. FIG. 8 and the elements shown in FIG. 8 are discussed above. FIG. 11 illustrate the text field 1108 configured to display the audio signal's amplitude in dB units. Thus, the audio signal magnitude may be displayed in Db units. Also shown are text fields for the peak signal magnitude 1112 and the average signal magnitude 1116.

Figure 12:
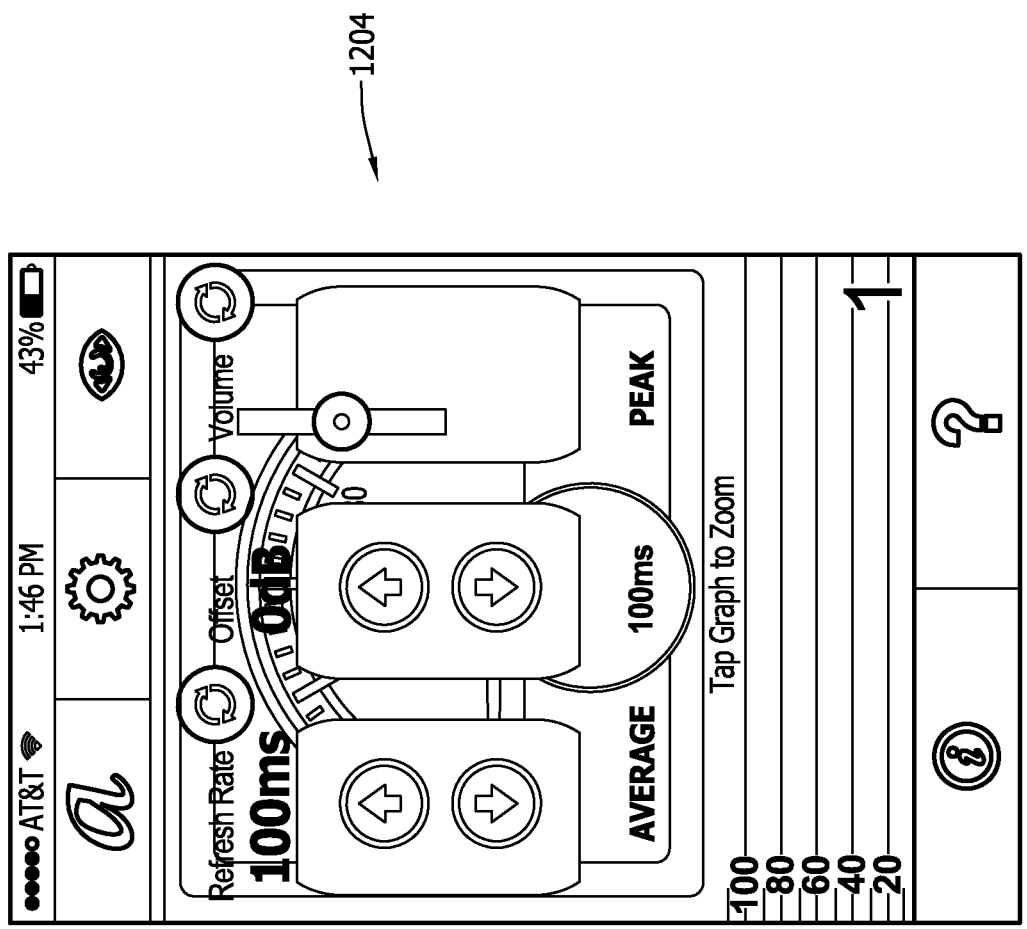
FIG. 12 is an example screen display for controlling offset and refresh rate.

At a step 936 the user may optionally set one or more offset levels for the one or more channels and one or more frequency based filtering levels for the one or more channels. An offset level is a minimum threshold that the audio signal may exceed before the incoming audio signal is presented to the user. This is used to reduce or eliminate background noise. Frequency equalization, although new in this environment of use, is known to those familiar in audio system and as such is not shown in detail herein. FIG. 12 is an example screen display for controlling offset and refresh rate. In FIG. 12, the center area 1204 of the screen shows, from left to right, the refresh rate control, the offset value control, and the volume control.

At a step 940 the user may optionally set or adjust a refresh rate for the display of data or the acceptance of data or the signal processing of the data. This will control how often the display is updated or how many samples per second are presented to the user or recorded. At a step 944, the user may access online or stored help files, instructions, or tutorial to assist the user, in real time, with the specific functions and operation of the device.

At a step 948, the user activates the machine and initiates the monitoring process. As part of this, at a step 952, the user selects a channel for monitoring. This selected channel is then the channel for which audio is routed through to the user, such as to the mobile device and then the audio player, such as a speaker or headphones. FIGS. 6 and 7 define the process of changing channels in greater detail. At a step 958, the user may optionally elect to record and record the audio files from the selected channel. This provides a permanent record of the audio from the channel which can be used for presentation to others that the audio event was occurring and after repair or adjustment, the audio event is no longer occurring. The audio file may also be stored for later analysis or transmission to a remote location, such as by email, text, or file upload.

At a step 962, the user may adjust one or more settings of the software or hardware in real time to improve detection. For example, the user may adjust any of the setting described above to improve detection. At a decision step 966 the user determines whether they have detected abnormal or unwanted sounds as a result of the monitoring at steps 952 and 962. If the abnormal or unwanted sound is identified, then the operation may advance to step 978. If the abnormal or unwanted sound is identified is not yet identified then the operation advances to decision step 970.

Figure 13:
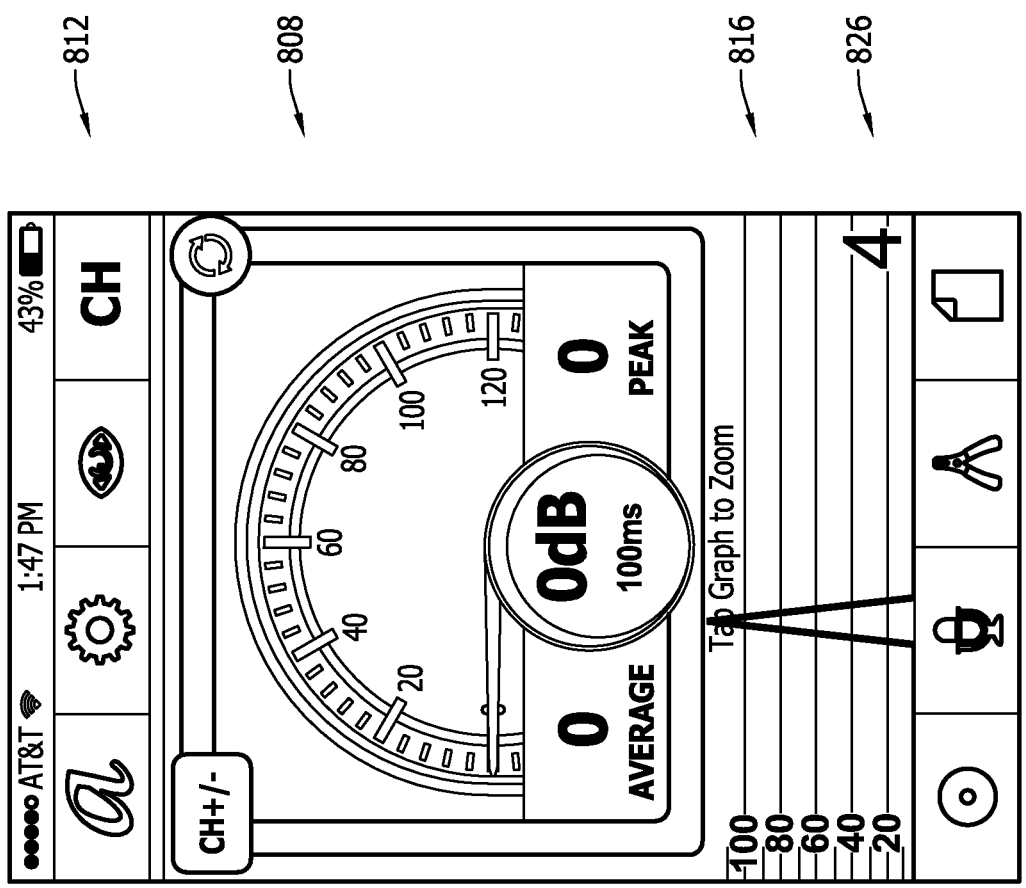
FIG. 13 illustrates an exemplary screen shot of a tone generated by the mobile device to cause the audio controller to change the channel.

At decision step 970 the user may select another channel for monitoring such as by listening. This may occur by the user tapping or otherwise selecting a function of mobile device that selects the next channel or another user selected channel. This may occur at step 974 if the user has not yet monitored all channels. FIG. 13 illustrates an exemplary screen shot of a tone 1304 shown in area 816 generated by the mobile device to cause the audio controller to change the channel. This tone is presented to the audio controller to cause the audio controller to change the channel presented to the mobile device. FIG. 13 is generally similar to FIG. 8 with common elements being labeled with identical reference numbers. From step 974, the operation returns to the step 952 for additional monitoring.

In one embodiment, the software executing on the mobile device may have an auto monitor mode whereby the software automatically selects between each channel to monitor each channel for unwanted noise, such as noise over a threshold or noise that is higher than allowable for a particular connection point on the machine. By automatically monitoring for sounds, including the intensity and frequency, the system may be better and to detect and diagnose the sound than a human listener, which may have unknown hearing capability.

If all of the channels have been monitored in decision step 970, then the operation advances to step 978. At step 978, the monitoring session is complete and the operation advances to step 980. At step 980, the user may determine the location of the noise or vibrations, based on the monitoring, and take steps to correct the unwanted or abnormal noise or vibration. At a step 984, the user may optionally review any audio recording made during the session. The audio recording may be presented along with a visual display of the channel, intensity, and frequency profile. It is also contemplated that the user may present this recording to third parties, such as a before and after fixing profile.

Figure 14:
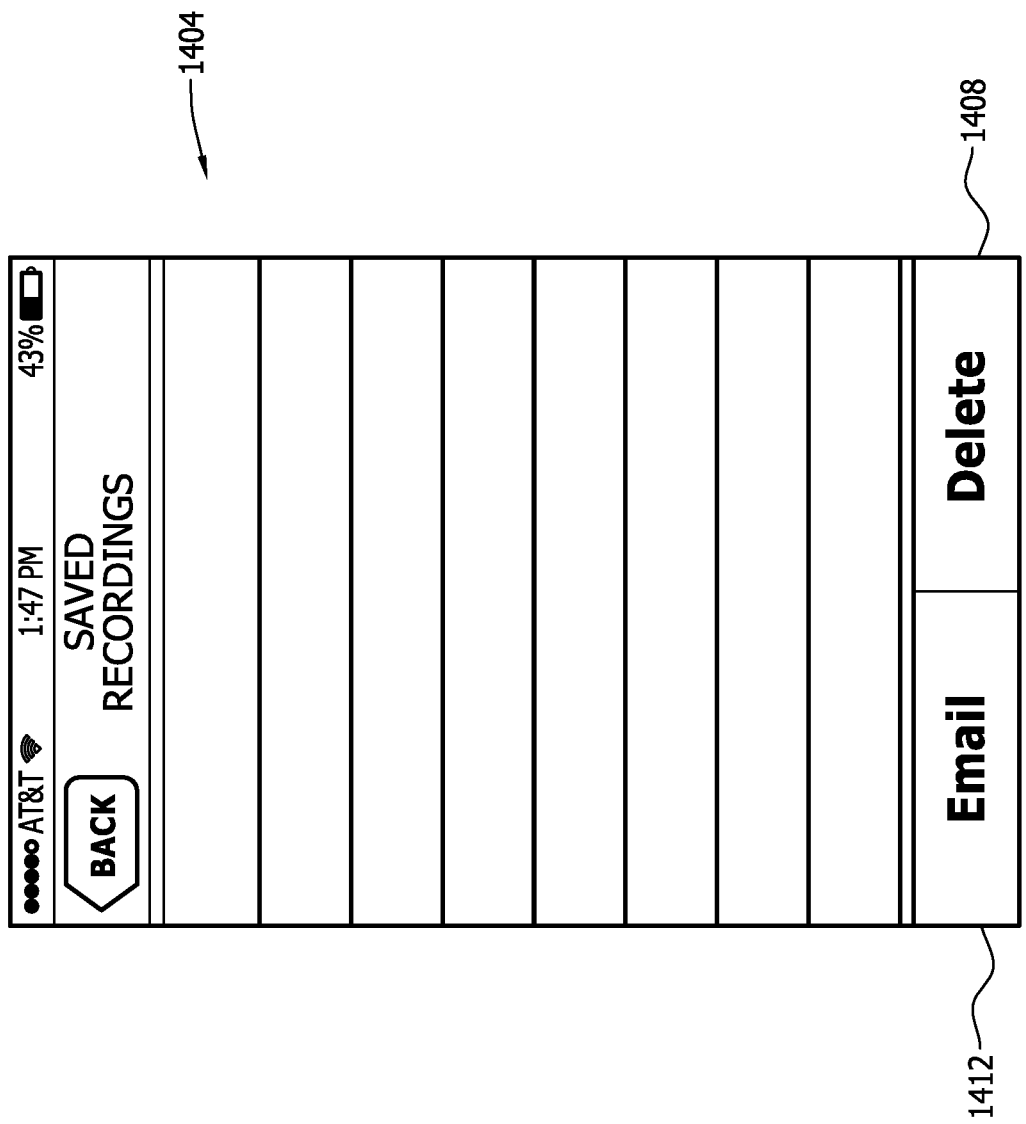
FIG. 14 illustrates an example screen display showing file listings with an option to e-mail audio file.

In addition, at a step 988 the audio file, with all associated data, such as channel, channel location, frequency profile, machine type, weather, date, may be stored and transmitted to a third party for analysis or stored on the mobile device and analyzed. FIG. 14 illustrates an example screen display showing file listings with an option to e-mail audio file. In this figure, a list of audio recordings (with associated data, such as channel, date, time, offset, frequency equalization, etc.) is presented in list section 1404. Also provided for the user is a delete file option 1408 and an e-mail file option 1412. This may be referred to as file management. The email file option allows the user to send the file to a remote location or other person. The user may also upload or otherwise transmit the file.

Figure 15:
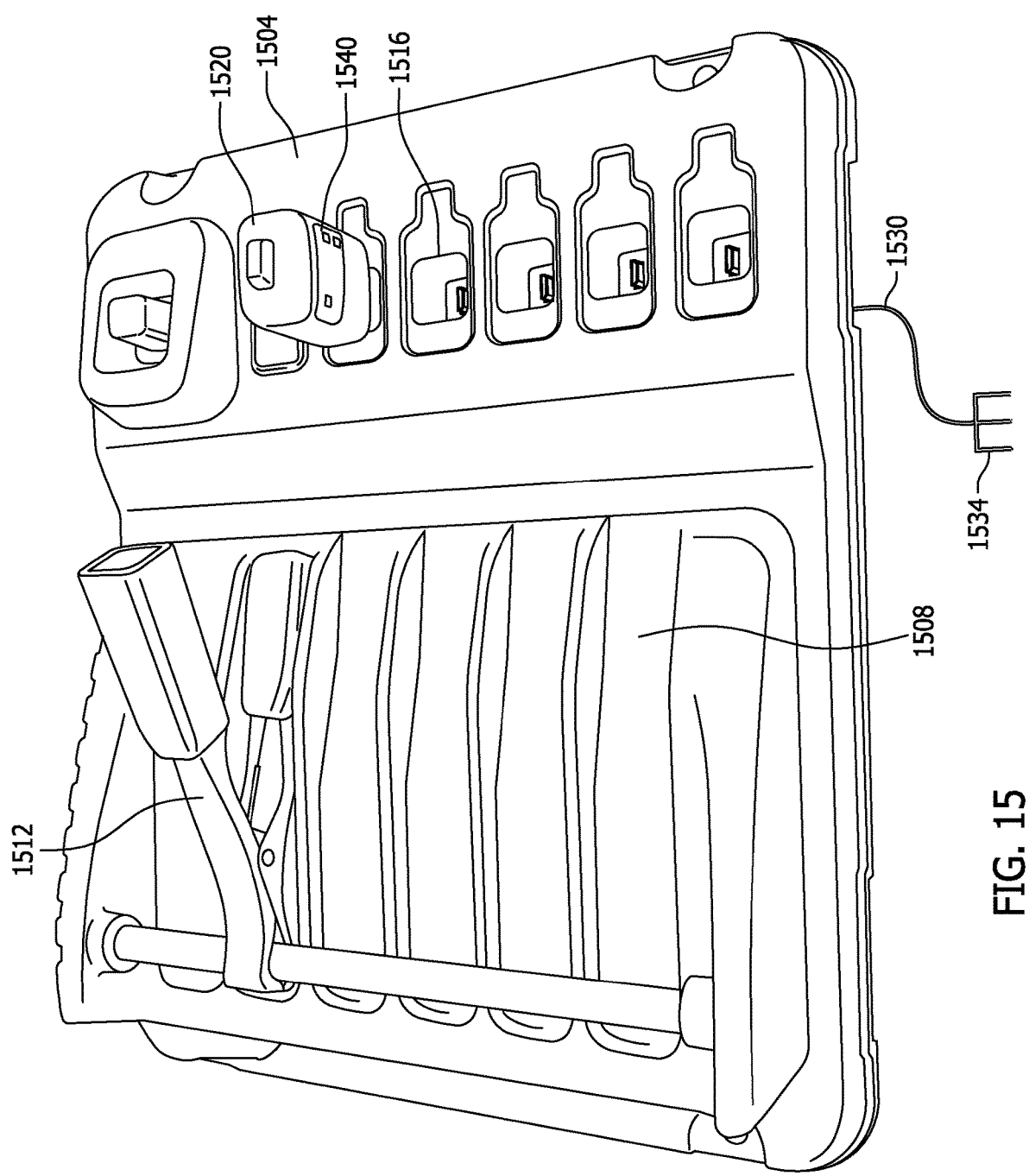
FIG. 15 illustrates an exemplary a storage and charging tray for a wireless clamps.

FIG. 15 illustrates an exemplary a storage and charging tray for wireless clamps. This is but one possible embodiment and other configurations are contemplated. As shown, the storage and charging tray 1504 (tray) includes a generally flat base configured to rest on a table or mount to a wall. The tray 1504 includes a clamp storage area 1508 configured to store one or more clamps 1512 when the clamps are not in use. Also part of the tray 1504 are transceiver charging ports 1516 configured to electrically connect to a clamp transmitter 1520 to charge a battery in the clamp transmitter. As shown, the clamp transmitter is separable from the clamp 1512 for charging or servicing, but it is contemplated that the clamp and transmitter may be combined into a single unit. A power cord 1530 with associated plug 1534 provides power to the tray to effect charging.

Figure 16:
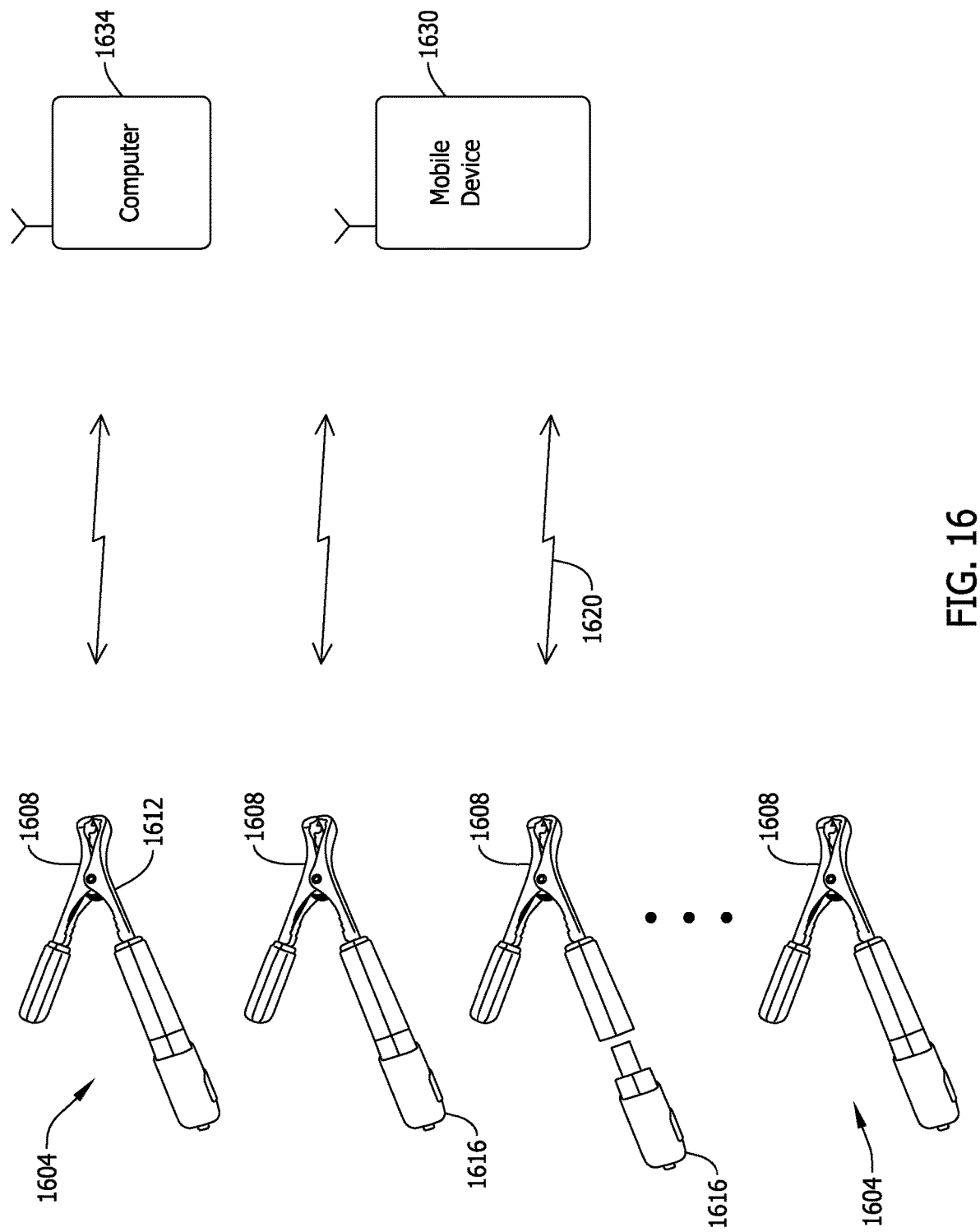
FIG. 16 illustrates a block diagram of a system overview of the clamps in communication with a computer or mobile device.

FIG. 16 illustrates a block diagram of a system overview of the clamps in communication with a computer or mobile device. In general, the clamps 1604 are configured with a clamping portion 1608 and a microphone 1612 and wireless transmitter 1616 that transmits a signal via a wireless link 1620 to a computer 1634 or mobile device 1630. The clamps may be any type clamp or connector capable or linking the microphone to a part or element to be monitored for noise, vibration, squeaks or any other type audible or inaudible sound. Because the electronics including microphone and transmitter, and computer or mobile device may detect even inaudible events, it is contemplated that the system may operate for audible or inaudible sounds or vibration thus detecting anomalies even before being able to be heard.

Any number of clamps 1604 may be linked for communication with the computer 1634 or mobile device 1630. The clamps 1604 and the mobile device 1630 are discussed below in greater detail.

Figure 17:
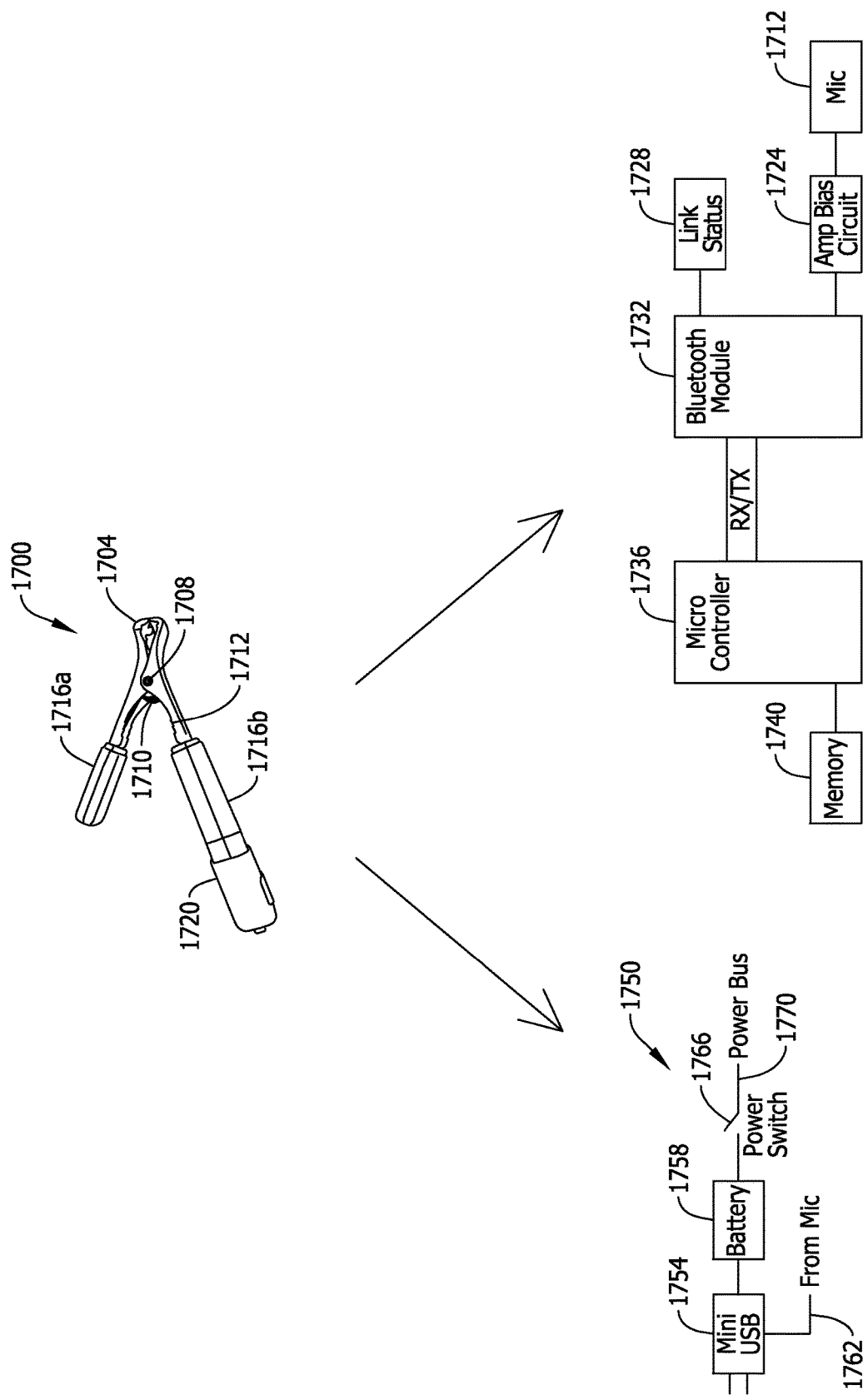
FIG. 17 illustrates an exemplary diagram of a clamp with associated block diagram of the electronic elements.

FIG. 17 illustrates an exemplary diagram of a clamp 1700 with associated block diagram of the electronic elements. This is but one possible configuration of a clamp 1700 and clamp electronics and as such, it is contemplated that other configuration of claim design, clamping mechanism and electronics within or associated with the clamp may be created without departing from the claims that follow.

At the top of FIG. 17 is the clamp 1700 that includes clamp jaws 1704 which are hinged about a pivot 1708 and biased by a spring 1710. A microphone 1712 is located near the jaws or pivot and may be held in place by any known means, including disposed under the spring 1710.

Opposite the jaws 1704 are a first handle 1716A and a second handle 1716B configured to be grasped and squeezed by the user to open the jaws 1704. An end of the second handle 1716B is a physical and electrical connector to enable connection of the clamp transmitter 1720 to the second handle.

Below the clamp in FIG. 17 is an associated block diagram of the transmitter electronics within the clamp transmitter 1720. The electronics of the clamp transmitter is separated for purposes of discussion into two elements namely, a power section and a signal processing section. These two sections operate in unison and are comingled on the circuit board and area within a clamp transmitter housing.

The power section 1750 includes a connector 1754 which in this embodiment is a mini USB port that serves a dual purpose and includes both a charging path to a battery 1758 and a microphone signal path 1762. The battery 1758 may be any type battery configured to store electric charge. In one embodiment the battery is a 100 milliamp 3.3 volt battery constructed with lithium polymer or lithium ion chemistry. Between the battery 1758 and a power bus 1770 is a power switch 1766 that selectively connects the battery to the signal processing section. In one embodiment, the switch 1766 is configured as a jumper that completes the power circuit when the clamp transmitter is plugged into the clamp handle to allow a loop to be created. When unplugged an open circuit is established. The power bus 1770 connects to the various elements of the signal processing section that require power for operation, as would be understood by one of ordinary skill in the art.

In one embodiment the power switch 1766 is actuated using a jumper system that provides power to the signal processing section when the clamp transmitter 1720 is plugged into the end of the second handle 1716B. This functions as an automatic power switch and system activation. When the clamp transmitter 1730 is disconnected from the second clamp handle, the switch 1765 disconnects power from the transmitter module. Likewise, establishing the transmitter module in the charging port shown in FIG. 15 enables the charging section to charge the battery.

The signal processing section includes the microphone 1712 which detects vibration, either vibration of the monitored apparatus or acoustic waves, and converts the vibration into an electrical signal. The output of the microphone 1712 is presented to a biasing circuit/amplifier 1724 that is configured to increase the magnitude of the microphone output signal. The amplified signal is presented to a Bluetooth module 1732 for processing and wireless transmission to a remote device, such as a computer or mobile device. Operation of Bluetooth transmitter modules are understood by those of ordinary skill in the art and as such are not described in detail herein. The Bluetooth module is available from JS Products located in Las Vegas, Nev. and numerous other vendors that offer Bluetooth transmitters and custom solutions. Although configured in this embodiment with a Bluetooth technology, it is contemplated that any wireless communication standard may be employed such as but not limited to WiFi or any RF communication link.

Also connected to the Bluetooth module 1732 is a user interface 1728 in the form of one or more LED lights 1540 (see FIG. 5) which provide color coded indicators to the user regarding the link status. In this example embodiment, green indicates the clamp transmitter is charging while a blue flashing LED indicates that the device is discovered by the computer or mobile device but not connected. A red flashing LED indicates that the clamp transmitter is connected, but not the active channel. If both red/blue LEDs are flashing, the clamp transmitter is ready to be discovered while a blue indicator light indicates that the clamp transmitter is connected to a Bluetooth receiver, such as a computer or mobile device. This provides information to the user regarding the wireless link status and the operational status of the clamp transmitter. In other embodiments a screen display may be used, or the status may be communicated to the computer or mobile device for presentation to the user.

It is further proposed that the color of the clamp transmitters outer housing is color coded to a color indicator shown on the screen during set up of the wireless link and during operation. This allows the user to easily associate the clamp housing color to the channel displayed on the screen. The screen color coding may be present on signal plots, text, or any other screen display of the channel. The term channel is defined herein to mean a particular clamp.

A microcontroller 1736 also connects to the Bluetooth module 1732. In this configuration the microcontroller 1736 is active during start-up to configure the Bluetooth module 1732. Configuration data and other operational program code, such as machine readable and/or executable instructions is stored in a memory 1740, such as an EEPROM, flash memory, or any other type storage element. During start-up of the device, the microcontroller configures the Bluetooth module and ensures the integrity of the device serial number.

The microcontroller is also capable of reconfiguring or updating the Bluetooth module or other aspects of operation through use of a programming interface. Thus, in this example embodiment a switch (not shown) in the connector allows the clamp transmitter to be set to two functions or mode. The first mode is a normal operating mode and the second mode is programming mode allowing the microcontroller 1736 (device programmer/user) to communicate directly to the Bluetooth module 1732 for programming or changing the operational characteristics of the clamp module. Programming may be performed at the time of manufacture or during reconfiguration or updating of the device, such as but not limited to change how the clamp transmitter interfaces with the computer or mobile device, status lights, clamp identifiers and such operational aspects. The microcontroller 1736 may only be active at startup and thereafter enter sleep mode to conserve battery power. The microcontroller 1736 may be considered an optional element.

Figure 18:
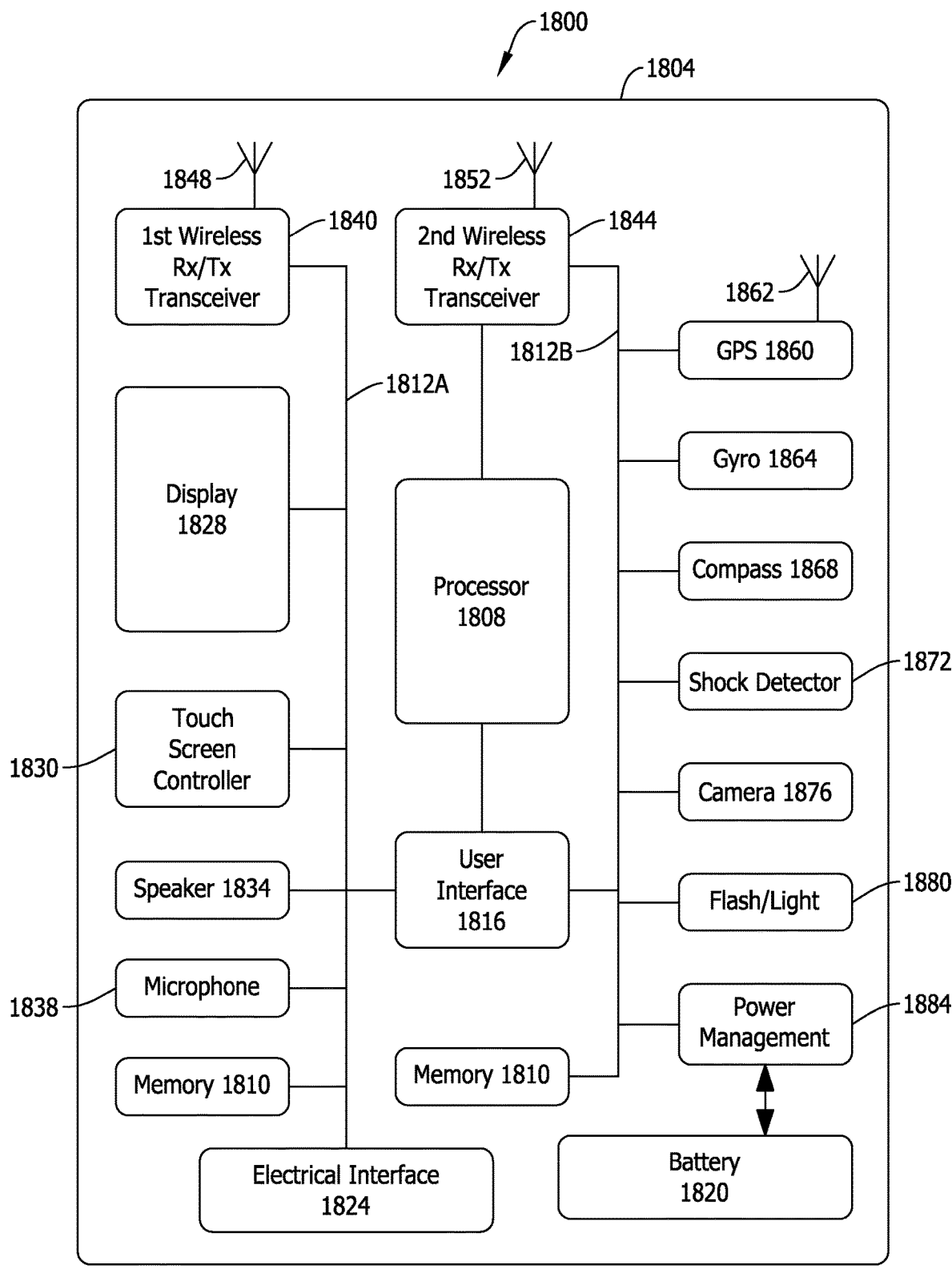
FIG. 18 illustrates an example embodiment of a mobile device (or computer).

FIG. 18 illustrates an example embodiment of a mobile device 1630 (or computer 1634). This is but one possible device configuration, and as such it is contemplated that one of ordinary skill in the art may differently configure the mobile device. The device 1800 may comprise any type of fixed or mobile communication device that can be configured in such a way so as to function as described below. The mobile device may comprise a PDA, cellular telephone, smart phone, tablet PC, wireless electronic pad, or any other computing device.

In this example embodiment, the mobile device 1800 is configured with an outer housing 1804 that protects and contains the components described below. Within the housing 1804 is a processor 1808 and a first and second bus 1812A, 1812B (collectively 1812). The processor 1808 communicates over the buses 1812 with the other components of the mobile device 1800. The processor 1808 may comprise any type of processor or controller capable of performing as described herein. The processor 1808 may comprise a general purpose processor, ASIC, ARM, DSP, controller, or any other type processing device.

The processor 1808 and other elements of the mobile device 1800 receive power from a battery 1820 or other power source. An electrical interface 1824 provides one or more electrical ports to electrically interface with the mobile device 1800, such as with a second electronic device, computer, a medical device, or a power supply/charging device. The interface 1824 may comprise any type of electrical interface or connector format.

One or more memories 1810 are part of the mobile device 1800 for storage of machine readable code for execution on the processor 1808, and for storage of data, such as image data, audio data, user data, medical data, location data, shock data, or any other type of data. The memory may store the messaging application (app). The memory may comprise RAM, ROM, flash memory, optical memory, or micro-drive memory. The machine readable code as described herein is non-transitory.

As part of this embodiment, the processor 1808 connects to a user interface 1816. The user interface 1816 may comprise any system or device configured to accept user input to control the mobile device. The user interface 1816 may comprise one or more of the following: keyboard, roller ball, buttons, wheels, pointer key, touch pad, and touch screen. A touch screen controller 1830 is also provided which interfaces through the bus 1812 and connects to a display 1828.

The display comprises any type of display screen configured to display visual information to the user. The screen may comprise an LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 1828 receives signals from the processor 1808 and these signals are translated by the display into text and images as is understood in the art. The display 1828 may further comprise a display processor (not shown) or controller that interfaces with the processor 1808. The touch screen controller 1830 may comprise a module configured to receive signals from a touch screen which is overlaid on the display 1828. Messages may be entered on the touch screen 1830, or the user interface 1816 may include a keyboard or other data entry device.

Also part of this exemplary mobile device is a speaker 1834 and microphone 1838. The speaker 1834 and microphone 1838 may be controlled by the processor 1808 and are configured to receive and convert audio signals to electrical signals, in the case of the microphone, based on processor control. Likewise, processor 1808 may activate the speaker 1834 to generate audio signals. These devices operate as is understood in the art and as such are not described in detail herein.

Also connected to one or more of the buses 1812 is a first wireless transceiver 1840 and a second wireless transceiver 1844, each of which connect to respective antenna 1848, 1852. The first and second transceiver 1840, 1844 are configured to receive incoming signals from a remote transmitter and perform analog front end processing on the signals to generate analog baseband signals. The incoming signal may be further processed by conversion to a digital format, such as by an analog to digital converter, for subsequent processing by the processor 1808. Likewise, the first and second transceiver 1840, 1844 are configured to receive outgoing signals from the processor 1808, or another component of the mobile device 1808, and up-convert these signal from baseband to RF frequency for transmission over the respective antenna 1848, 1852. Although shown with a first wireless transceiver 1840 and a second wireless transceiver 1844, it is contemplated that the mobile device 1800 may have only one such system or two or more transceivers. For example, some devices are tri-band or quad-band capable, or have Bluetooth and NFC communication capability.

It is contemplated that the mobile device, and hence the first wireless transceiver 1840 and a second wireless transceiver 1844 may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 1812B which also interfaces with the processor 1808. These devices include a global positioning system (GPS) module 1860 with associated antenna 1862. The GPS module 1860 is capable of receiving and processing signals from satellites or other transponders to generate location data regarding the location, direction of travel, and speed of the GPS module 1860. GPS is generally understood in the art and hence not described in detail herein.

A gyro 1864 connects to the bus 1812B to generate and provide orientation data regarding the orientation of the mobile device 1804. A compass 1868, such as a magnetometer, provides directional information to the mobile device 1804. A shock detector 1872, which may include an accelerometer, connects to the bus 1812B to provide information or data regarding shocks or forces experienced by the mobile device. In one configuration, the shock detector 1872 generates and provides data to the processor 1808 when the mobile device experiences a shock or force greater than a predetermined threshold. This may indicate a fall or accident.

One or more cameras (still, video, or both) 1876 are provided to capture image data for storage in the memory 1810 and/or for possible transmission over a wireless or wired link or for viewing at a later time. The processor 1808 may process image data to perform image recognition, such as in the case of, facial detection, item detection, facial recognition, item recognition, or bar/box code reading.

A flasher and/or flashlight 1880 are provided and are processor controllable. The flasher or flashlight 1880 may serve as a strobe or traditional flashlight, and may include an LED. A power management module 1884 interfaces with or monitors the battery 1820 to manage power consumption, control battery charging, and provide supply voltages to the various devices which may require different power requirements.

Figure 19:
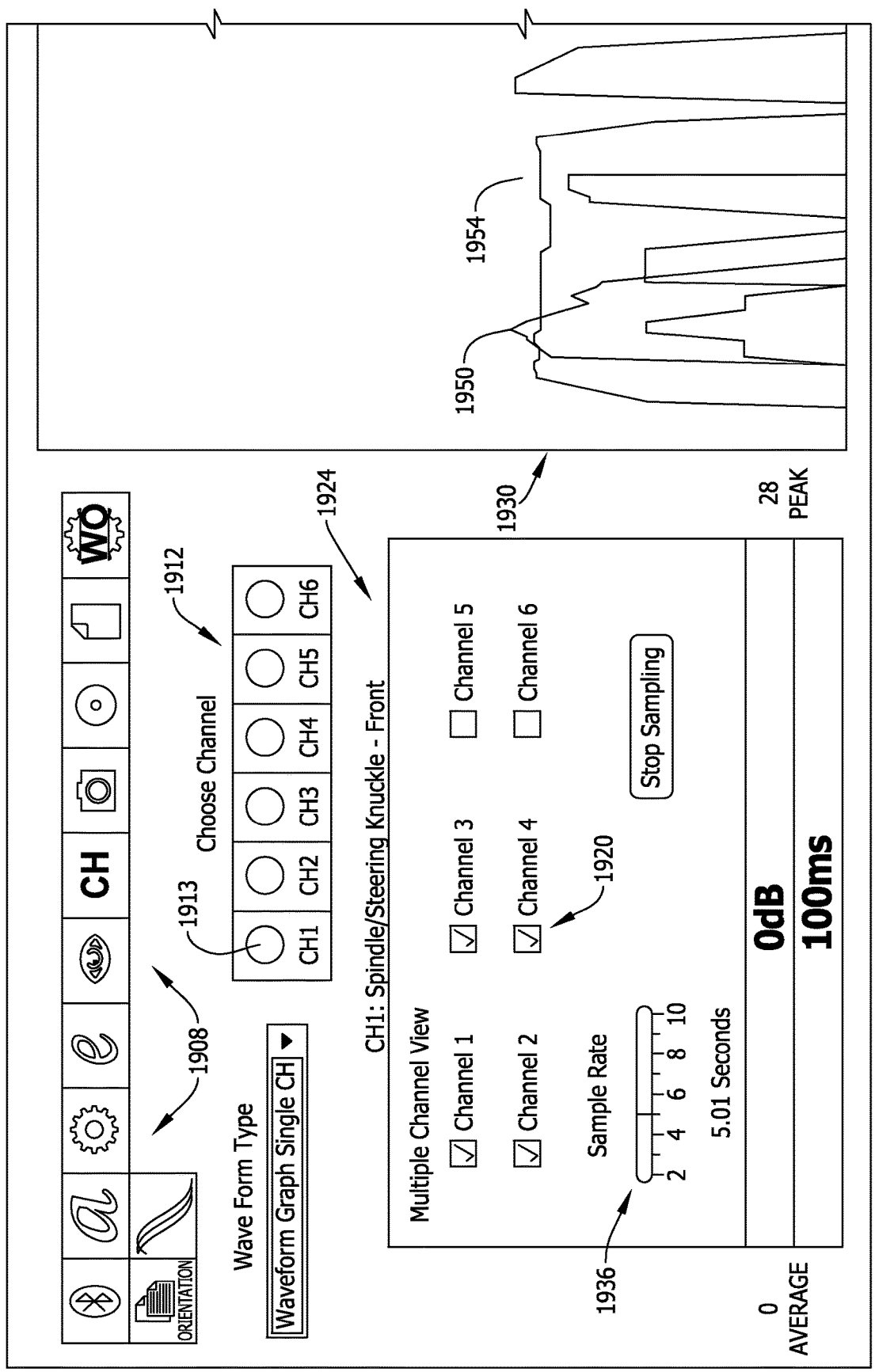
FIG. 19 illustrates an exemplary screen display showing features of the disclosed system.

FIG. 19 illustrates an exemplary screen display showing sampling and plotting features of the disclosed system. The features of the wired version as described herein are incorporated in the wireless system and each feature may be enabled or disabled in either system. As shown in exemplary screen display 1904, a control bar 1908 is provided to offer the functionality discussed above and below to access various features of the software and enable different aspects of operation as described herein. Also part of this embodiment is a channel selection bar 1912 which shows each color coded channel and allows a user to touch of click on this area 1913 of the screen to change the active channel. The areas 1913 may be color coded on the screen to match to color of the clamp transmitter housing.

In this particular screen display, the system is configured with channel selection boxes 1920 in a display area that displays the active channel. The user may select which channels are to be plotted in a plot display 1930. Selecting multiple channels for display in the selection boxes 1920, results in each corresponding selected channel being plotted in the plot display 1930. In this example display, channels 1, 2, 3, and 4 are selected so there are four color coded plots displayed in the plot display 1930. Thus, a first plot 1950 is shown overlapped with a second plot 1954, along with other plots as shown. In this embodiment, magnitude is plotted as a function of time. By overlapping and plotting the channel signal from each clamp transmitter, the user may visually determine which channel has the highest magnitude and thus which clamp is picking up the noise or vibration. This increases efficiency and accuracy of noise and vibration detection. The user may also de-select the selection boxes, on a channel by channel basis, and such change are reflected in the plots.

Various type plots may be selected for display by the user including bar graphs, sin wave graphs, line grafts, frequency response graphs (FFT based plots) and such plots and graphing may occur on an individual channel basis or superimposed in a common area. The plots and graphs may be presented in real time or stored in plotted from a data file.

Use of an FFT operation on the signal received from the transmitter or the audio signal presents the signals' frequency contents to the user, thereby allowing the user to detect and focus on particular frequencies which may be known to indicate a problem, frequencies which are abnormal, or frequencies which are at an audible level detectable by the user. For example, an engine may generate a low frequency hum, which is normal, but a high frequency component is not normal, and should be corrected. By presenting isolating the signal by frequency components, additional helpful information is provided to the user.

Also shown in display screen 1904 is the sampling rate selector 1936. The sampling rate selector 1936 allows the user to select a sampling period of a channel before moving to and displaying another channel. This automatically samples and displays in a superimposed arrangement signals from different channels at a rate set by the user. In this configuration, the visual display combines the audio signal on each channel, but the audio signal, provided to the user via a speaker or headphones plugged into the computer or mobile device are not superimposed on one another.

Figure 20:
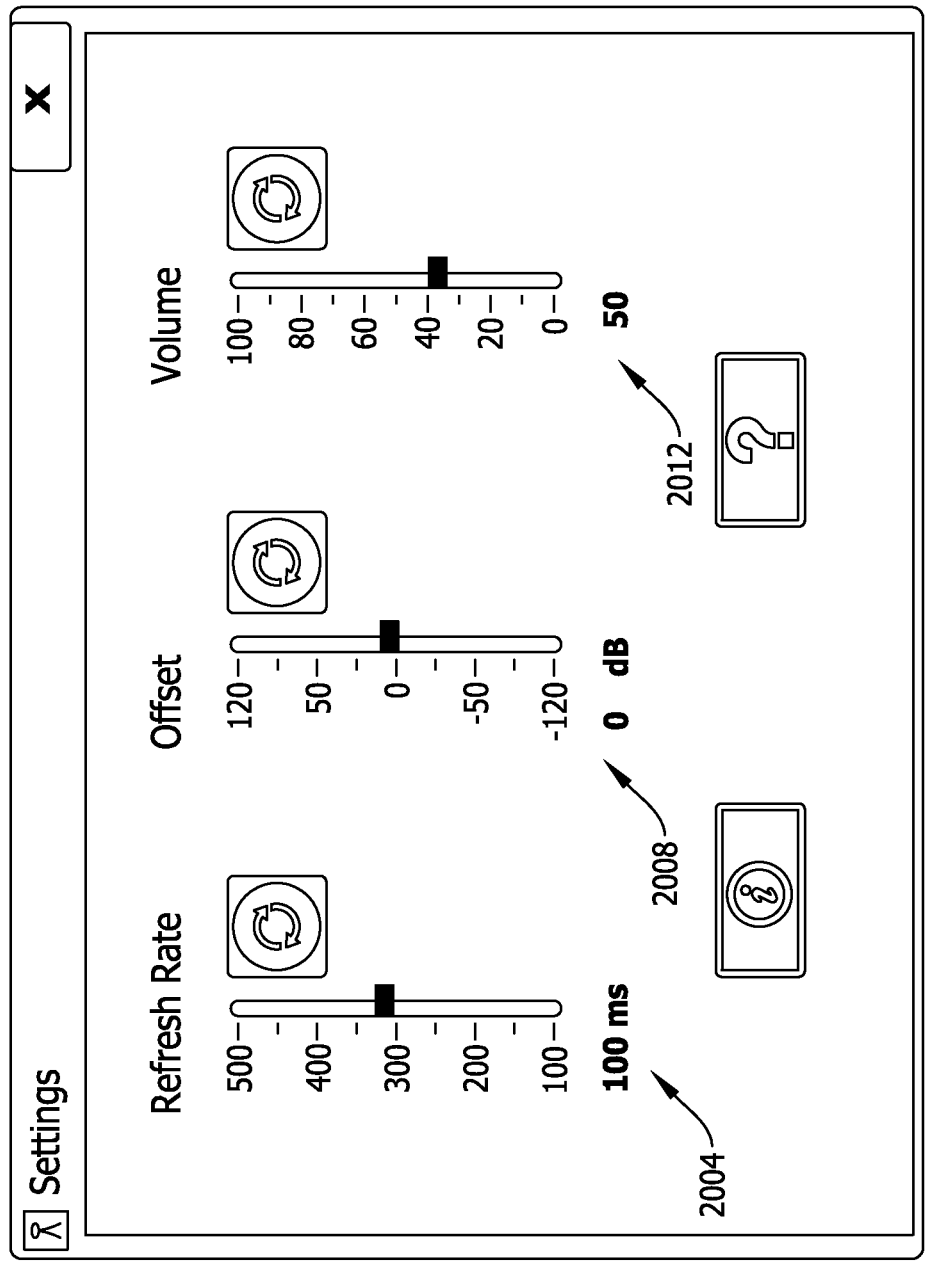
FIG. 20 illustrates an exemplary screen display showing refresh rate, offset and volume features of the disclosed system.

FIG. 20 illustrates an exemplary screen display showing refresh rate, offset and volume features of the disclosed system. Using this screen the user is able to adjust the refresh rate 2004 including numeric settings of time in milliseconds. The refresh rate is discussed above. The user may also set the offset 2008 using numeric values ranged around +/−120. The offset is discussed above. The user may also set the volume 2012 for the system or each channel. The function of the volume control is discussed above.

Figure 21:
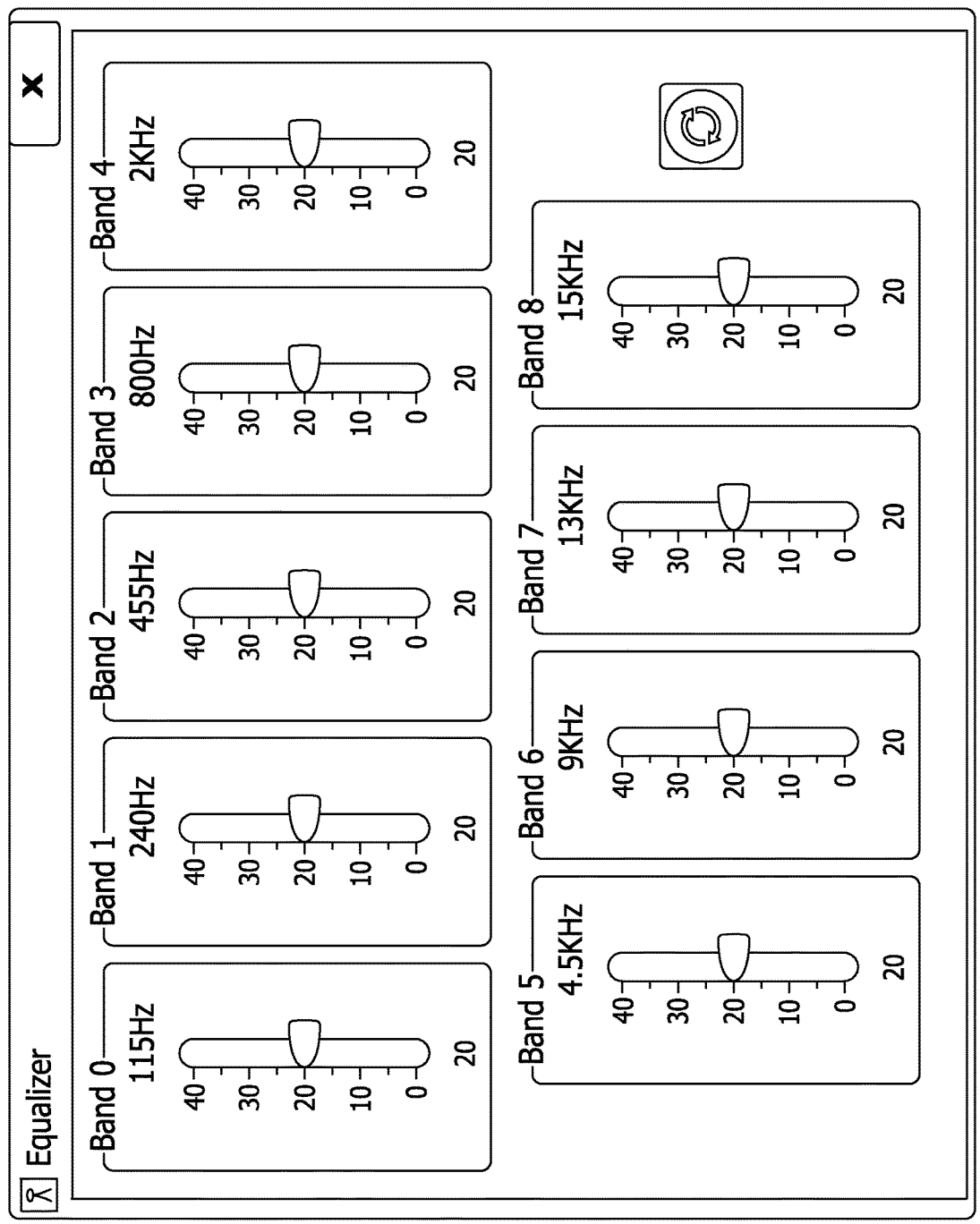
FIG. 21 illustrates an exemplary screen display showing signal equalization capability and features of the disclosed system.

FIG. 21 illustrates an exemplary screen display showing signal equalization capability and features of the disclosed system. As shown, the user is able to adjust the frequency response of the audio signal provided to the user and plotted on the display screen. This may be set uniquely for each channel or applied to all channels. As shown, the frequencies are separated into eight bands and each band is independently adjustable. By establishing the eight bands of equalization using the equalizer function, selected frequencies, such a road noise, background noise or exhaust noise may be removed, allowing the user to identify the noise or vibration of interest while excluding other tones from being presented. The signals at the particular frequencies may be amplified or attenuated.

Figure 22A:
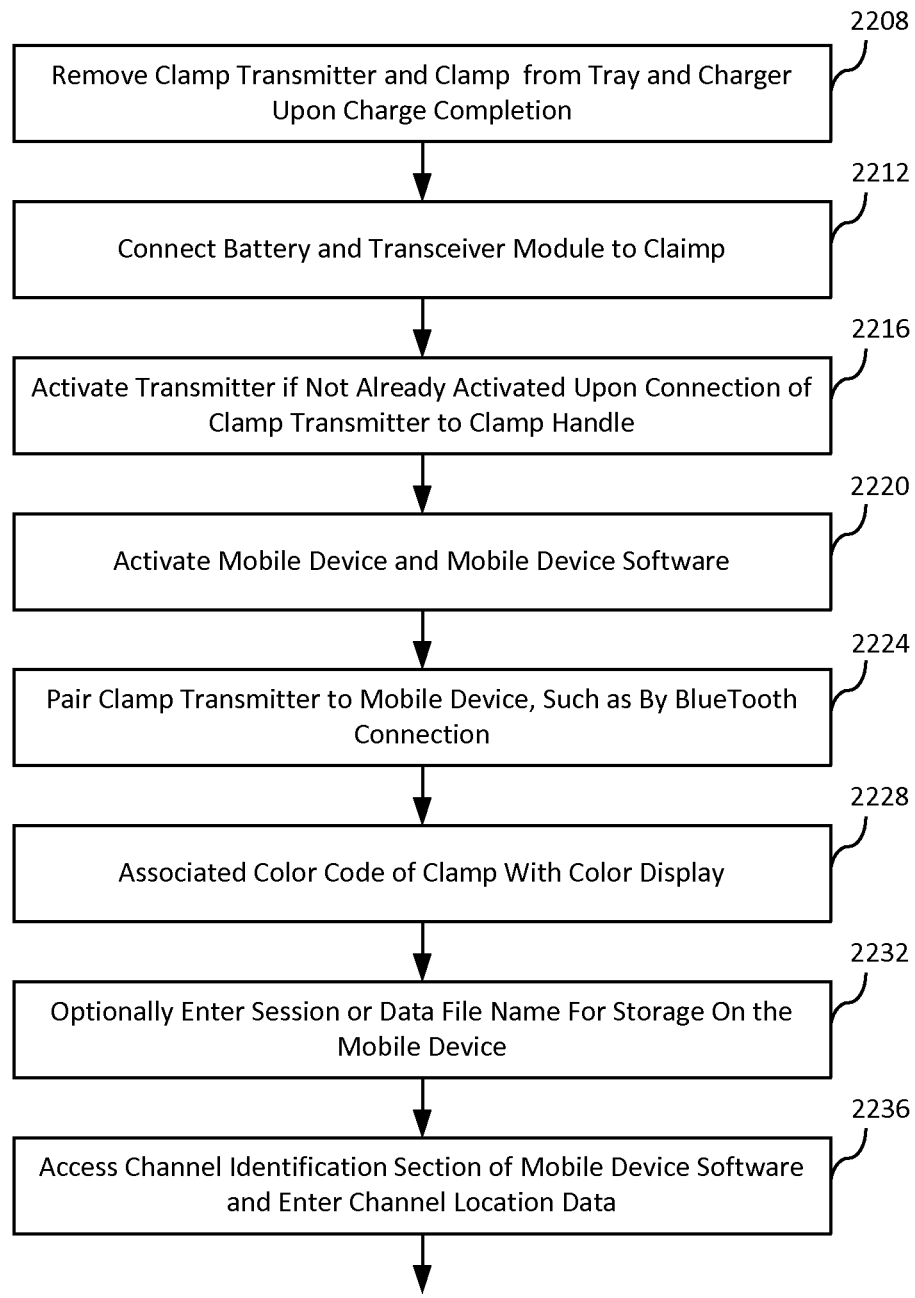
FIGS. 22A and 22B illustrate an operational flow diagram of an exemplary method of connecting and using the clamps with wireless transmitters.
Figure 22B:
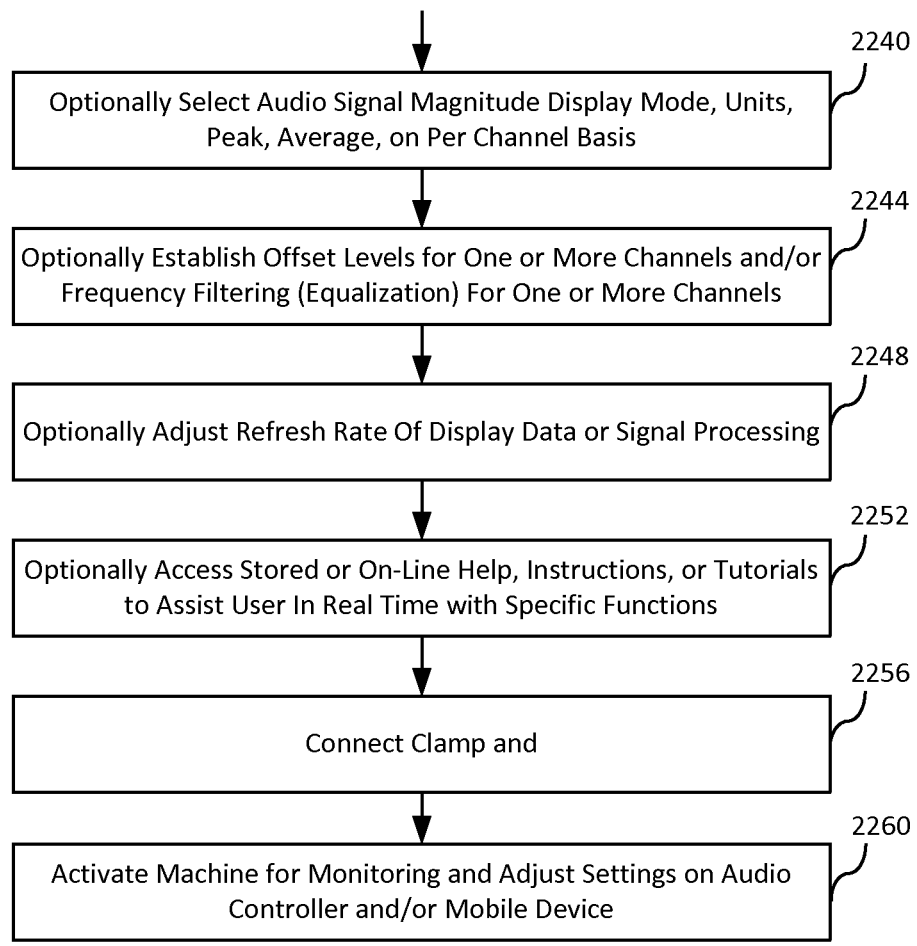

FIGS. 22A and 22B illustrates an operational flow diagram of an exemplary method of connecting and using the wireless clamps. This is but one possible method of operation and as such, other methods are possible. It is further proposed that any method described above may be combined with this method of operation associated with the wireless clamps. There is overlap with the method of operation associated with the wired clamps as described above and it is contemplated that any operational step from the wired clamps occur and be incorporated into the method of operation of the wireless clamps.

At a step 2208 the user would remove the clamp transmitter and clamp from the tray and charger, such as upon completion of the battery charging process. Then, at a step 2212 the user could connect the battery, within the clamp transmitter, to the clamp to form a combined unit ready for connection to items which will be monitored for noise. In other methods of operation, the transmitter and clamp may be configured such that they are a unitary item and not separable.

At a step 2216, the transmitter is activated, either by a user using a manual switch, or automatically by connecting the clamp transmitter to the clamp handle. Then, or before, a receiver of the wireless signal from the clamp transmitter is activated. This occurs at step 2220. Any receiver may receive the signal, but in this embodiment a Bluetooth equipped mobile device or computer (hereafter referred to as mobile device) is activated for use. Software, including machine readable code and a processor is activated as part of this step.

At a step 2224 the operation using the Bluetooth operational protocol pairs the transmitter associated with the clamp with the receiver in the mobile device. This occurs using known communication standards and communication standards other than Bluetooth may be utilized. One or more codes, such as by LED lights or a screen, may display the link status to the user.

At a step 2228, the system, either automatically or manually, color codes each wireless channel, which correspond to a clamp housing color, to a color coded display on the screen of the mobile device. This aids identification of the clamp and clamp location to the audio channel presented to the user visually and audibly.

At a step 2232, the user may optionally enter a session name or file name to store the monitoring. To do this the user may be presented with a file name entry screen or provide an option to save the session. The session data may be an audio or visual file of the monitoring, and such file may be stored and presented for later viewing/listening or email to a third party.

At a step 2236, the user may optionally access the channel identification section of the mobile device software and enter channel location data. This may occur by the software presenting data entry fields for each channel into which a user may type text or numbers. For example, the user may enter the term 'front wheel' well for channel 1 to designate that channel 1 transducer is connected to this location. This data may be stored for a final report or to aid analysis. FIG. 10 provides an exemplary screen display of the channel identification.

At a step 2240, the user may optionally set signal magnitude display mode, units, peak signal values, average signal values for the display for one or more channels. For example, the user may establish the software to display the detected signal in various ways, such as peak magnitude or average magnitude. The units in which the data is displayed are also adjustable by the user. This software functionality is shown in FIGS. 8 and 11.

At a step 2244 the user may optionally set one or more offset levels for the one or more channels and one or more frequency based filtering levels for the one or more channels. An offset level is a minimum threshold that the audio signal may exceed before the incoming audio signal is presented to the user. This is used to reduce or eliminate background noise. Frequency equalization, although new in this environment of use, is known to those familiar in audio system and as such is not shown in detail herein.

At a step 2248 the user may optionally set or adjust a refresh rate for the display of data, or the acceptance of data, or the signal processing of the data. This will control how often the display is updated or how many samples per second are presented to the user or recorded. At a step 2252, the user may access online or stored help files, instructions, or tutorial to assist the user, in real time, with the specific functions and operation of the device.

At a step 2256, the user may connect the clamps to the machine to be monitored, or the connecting may occur earlier in the process as each clamp is being named in the software. Care should be taken when connecting the clamp to avoid machine operation or moving parts. At a step 2260, the user activates the machine and initiates the monitoring process. As part of this step, the user selects one or more channels for monitoring. The user can change which channel is the active channel by clicking, using a mouse or other input device, or tapping a different channel icon on a touch screen. This selected channel is then the channel for which audio is presented to the user, through the mobile device and then the user, such as via speaker of the mobile device or headphones connected to the mobile device. The user may optionally elect to record the audio files from the selected channel. This provides a permanent record of the audio or visual plots from the channel which can be used for presentation to others that the audio event was occurring and after repair or adjustment, the audio event is no longer occurring. The audio file may also be stored for later analysis or transmission to a remote location, such as by email, text, or file upload.

As discussed above, the user may adjust one or more settings of the software stored on an executing on the mobile device or computer in real time to improve detection. For example, the user may adjust any of the setting described above to improve detection. The user may select another channel for monitoring at any time by touching or clicking the screen of the mobile device. This may occur by the user tapping or otherwise selecting a function of mobile device that selects the next channel or another user selected channel.

In one embodiment, the software executing on the mobile device may have an auto monitor mode whereby the software automatically selects between each channel to monitor each channel for unwanted noise, such as noise over a threshold or noise that is higher than allowable for a particular connection point on the machine. By automatically monitoring for sounds, including the intensity and frequency, the system may optimally detect and diagnose the sound and perform better than a human listener, which may have unknown hearing capability.

The user may determine the location of the noise or vibrations, based on the monitoring, and revisit any channel (clamp location) and take steps to correct the unwanted or abnormal noise or vibration. The user may optionally review any audio recording made during the session. The audio recording may be presented along with a visual display of the channel, intensity, and frequency profile. It is also contemplated that the user may present this recording to third parties, such as a before and after fixing profile.

The audio file, with all associated data, such as channel, channel location, frequency profile, machine type, weather, date, may be stored and transmitted to a third party for analysis or stored on the mobile device and analyzed.

As a further advantage to the innovation disclosed herein, it is also contemplated that the transmitter module (clamp transmitter) is separable from the clamp and as a result, may be electrically connected to other devices. Upon connection to a device other than the clamp, such as any device illustrated in FIGS. 4A and 4B such as a probe 428 (either hollow or metal tipped), or a suction cup attachment mechanism with microphone, vacuum wand (ability to listen to an interior of a vessel or pipe), a video camera, an audio microphone, a temperature sensor, or any other type probe or detector. With these type probes, the electrical signal from the probe, whether representing an audio signal, a video signal, temperature, vibration, or any other type data, is wirelessly transmitted to the mobile devices for processing by the software (machine executable code) running on a processor of the mobile device or computer. With any of these type data collection elements, the data, including audio and video) may be recorded on the mobile device or computer.

It is further contemplated that the features can be described in various product combination which have different functionality and features. The software (program code) may likewise have different features and functionality.

As a further advantage of the present innovation which uses a wireless link between the clamp and a computer or mobile device (hereinafter mobile device), the mobile device is able to simultaneously connect to multiple transmitters (clamp transmitter) at the same time. By establishing and maintaining a connection to a multiplier transmitter simultaneously, the user may rapidly establish different channels as the active channel thereby rapidly changing audio streams from each channel (clamp). Such rapid changes between audio streams benefits the user because they can quickly compare audio stream. To achieve rapid changes between channels, all wireless signals are concurrently received and all the inactive channels are muted while the active channels are unmuted. When a change in channel or audio stream occurs, the active channel is muted and the selected channel is quickly unmuted.

The analysis may be comparison to a database of other similar or normal sounds to determine more information about the sounds or vibrations based on comparison of this sound profile to from other similar situation. By using complex analysis against a large database of other sounds, diagnostics may be improved. It is contemplated that the sound may be uploaded or e-mailed to a remote location.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components (including, among other things, engines, layers, and applications), capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. One or more processors may be programmed or configured to execute any of the computer-executable instructions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A detection system comprising:
    a clamping device configured to releasably attach to a monitored element, the clamping device comprising
        an audio transducer configured to generate an audio signal responsive to noise or vibration associated with the monitored element; and
        a first and second handle, at least one of the first and second handles comprising a clamp connector;
    a wireless transmitter comprising a transmitter connector configured to selectively plug and unplug into and out of the clamp connector to establish a physical and electrical connection between the clamping device and the wireless transmitter, a transceiver configured to transmit the audio signal, or a modified version of the audio signal, and a battery;
    a mobile device located remote from the transmitter and configured to receive the transmitted audio signal or modified version of the audio signal, the mobile device comprising
        a receiver configured to receive the audio signal, or a modified version of the audio signal to establish a received signal;
        a display configured as a user interface and to display information to a user of the mobile device;
        a memory configured to store non-transient machine executable code; and
        a processor configured to read and execute the machine executable code stored on the memory, which when executed, causes the mobile device to:
            process the received signal to form an audio signal;
            present the audio signal to a speaker of the mobile device or a headphone port of the mobile device; and
            display the audio signal in graphical form on the display of the mobile device; and
    a clamp and storage area comprising a storage tray configured to store the clamping device and the wireless transmitter, the storage tray comprising at least one charging port configured to receive the transmitter connector of the wireless transmitter to charge the battery.

2. The system of claim 1, wherein the audio transducer comprises a piezo detector.

3. The system of claim 1, wherein the wireless transmitter includes a controller and one or more lights configured to provide status information to a user.

4. The system of claim 1, further comprising a second clamping device with an associated audio transducer and a second wireless transmitter, wherein when the second wireless transmitter is plugged into the second clamping device, the second wireless transmitter is configured to transmit a second audio signal to the mobile device.

5. The system of claim 4, wherein the wireless transmitter and the second wireless transmitter are configured to transmit the audio signal and the second audio signal to the mobile device concurrently, and the processor causes the mobile device to display the audio signal and the second audio signal concurrently.

6. The system of claim 5, wherein one of the audio signal and the second audio signal is defined as an active signal and the other of the audio signal and the second audio signal is muted.

7. The system of claim 1, wherein the mobile device processor is configured to receive input from a user regarding equalization and perform equalization on the received audio signal, or the modified version of the audio signal, according to the user settings prior to presenting the audio signal to the speaker or headphone port.

8. The system of claim 1, wherein the mobile device processor is configured to perform FFT signal processing on the audio signal, or the modified version of the audio signal, to display the frequency content of the received audio signal, or a modified version of the audio signal, to a user.

9. A system for recording detected information from a remote location using a wireless transmitter, the system comprising:
    a connector configured to attach to an element being monitored, the connector comprising a detector configured to detect information and generate an electrical signal representing the detected information;
    a transmitter module that selectively plugs into and unplugs from the connector, the transmitter module configured to receive the electrical signal from the connector and to wirelessly transmit the detected information to a remote receiver; and
    non-transitory machine-readable code configured to be stored on a memory and executable by a processor, the machine-readable code, upon execution by the processor, configured to:
        receive the detected information from a receiver,
        present the detected information to the user in graphical form on a display of an electronic device.

10. The system of claim 9, wherein the detected information is selected from the following types of information: sound, temperature, vibration, or pressure.

11. The system in accordance with claim 9, wherein the machine-readable code is further configured to process the detected information to generate an audio signal and present the audio signal to the user.

12. The system in accordance with claim 9, wherein the connector is a clamp having handles, and the transmitter module plugs into and unplugs from one of the handles.

13. The system in accordance with claim 9 wherein the machine-readable code is configured to accept input in the form of user settings from a user regarding equalization and perform equalization on the received signal according to the user settings.

14. The system in accordance with claim 9, wherein machine-readable code configured to process the detected information is further configured to store the detected information on a memory.

15. A method for detecting vibration or noise on a device, the method comprising:
    activating a wireless transmitter and plugging the wireless transmitter into a handle of an associated clamp;
    connecting the clamp to a device to be monitored;

detecting vibration or noise with a detector associated with the clamp;

generating an electrical signal representing the noise or vibration;

receiving the electrical signal representing the noise or vibration at the wireless transmitter;

transmitting a wireless signal, the wireless signal representing the vibration or noise;

receiving the wireless signal at an electronic device to create a received signal, the electronic device including a display, a user interface, a processor, and memory, the memory storing non-transitory machine-readable code, which when executed by the processor causes the electronic device to:

process the received signal to generate an audio signal;

present the audio signal to a speaker or headphone port of the electronic device;

process the received signal to present a graphical representation of the vibration or noise on the display; and unplugging the wireless transmitter from the handle of the clamp and inserting the wireless transmitter into a charge port of a storage tray to charge a battery of the wireless transmitter.

16. The method of claim 15, further comprising storing information regarding the noise or vibration on the memory of the electronic device to enable to noise or vibration to be audibly or graphically presented later in time.

17. The method of claim 15, wherein the step of presenting a graphical representation of the vibration or noise on the display includes performing a fast Fourier transform on the received signal to present information regarding frequency content of the vibration or noise on the display.

18. The method of claim 15, further comprising receiving an additional wireless signal representing additional vibration or noise from an additional wireless transmitter and displaying an additional graphical representation of the additional vibration or noise on the display concurrently with the displayed graphical representation.

* * * * *